United States Patent
Kajikawa

(10) Patent No.: US 10,464,614 B2
(45) Date of Patent: Nov. 5, 2019

(54) REINFORCEMENT STRUCTURE AT FRONT SIDE OF VEHICLE CABIN

(71) Applicant: TOYOTA JIDOSHA KABUSHIKI KAISHA, Toyota-shi, Aichi-ken (JP)

(72) Inventor: Kouta Kajikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/038,271

(22) Filed: Jul. 18, 2018

(65) Prior Publication Data

US 2019/0031246 A1 Jan. 31, 2019

(30) Foreign Application Priority Data

Jul. 28, 2017 (JP) .................................. 2017-146732

(51) Int. Cl.
*B62D 25/14* (2006.01)
*B62D 25/20* (2006.01)

(52) U.S. Cl.
CPC ........... *B62D 25/145* (2013.01); *B62D 25/20* (2013.01); *B62D 25/2045* (2013.01)

(58) Field of Classification Search
CPC ......... B62D 25/145; B62D 1/16; B62D 1/187

USPC .............................................. 296/193.02, 70
See application file for complete search history.

(56) References Cited

U.S. PATENT DOCUMENTS

| 7,921,564 B2 * | 4/2011 | Baudart ............... B62D 25/142 29/428 |
| 8,919,855 B2 * | 12/2014 | Ruiz Rincon ........ B62D 25/145 296/193.02 |
| 9,340,236 B2 * | 5/2016 | Kong ....................... B62D 1/16 |

FOREIGN PATENT DOCUMENTS

JP 2007-331614 A 12/2007

* cited by examiner

*Primary Examiner* — Joseph D. Pape
(74) *Attorney, Agent, or Firm* — Oliff PLC

(57) ABSTRACT

A floor brace has an upper end joined to a rear end of a cowl-to brace, is placed to incline toward a rear side of a vehicle, from the upper end toward a lower end, and has the lower end joined to a side wall of a floor tunnel. The rear end of the cowl-to brace and the upper end of the floor brace include overlap portions which overlap each other in a front-and-rear direction of the vehicle. A first bolt joint portion and a second bolt joint portion which are bolt-joined in a width direction of the vehicle are formed on each of the overlap portions of the cowl-to brace and the floor brace. A fragile portion that crosses between the first bolt joint portion and the second bolt joint portion is formed on one of the overlap portions of the cowl-to brace and the floor brace.

3 Claims, 19 Drawing Sheets

REINFORCEMENT STRUCTURE AT FRONT SIDE OF VEHICLE CABIN

CROSS REFERENCE TO RELATED APPLICATION

The disclosure of Japanese Patent Application No. 2017-146732 filed on Jul. 28, 2017, including the specification, claims, drawings, and abstract, is incorporated herein by reference in its entirety.

TECHNICAL FIELD

The present disclosure relates to a reinforcement structure that supports a steering wheel or the like at a front side of a vehicle cabin.

BACKGROUND

As a reinforcement structure at a front side of a vehicle cabin which supports a steering wheel, an audio system, or the like in an automobile, an instrument panel reinforcement pipe (hereinafter also referred to as an "instrument panel R/F pipe"), a floor brace, and a cowl-to brace are used.

For example, as exemplified in FIG. 18, an instrument panel R/F pipe 100 is a circular tubular pipe member, extends in a width direction of a vehicle, and has respective ends fixed on front pillars (A pillars) (not shown). A steering column 106 is supported on the instrument panel R/F pipe 100 via a steering support 102 and a steering bracket 104.

A cowl-to brace 108 is placed in a front-and-rear direction of the vehicle, and supports the instrument panel R/F pipe 100 primarily in the front-and-rear direction of the vehicle. A front end of the cowl-to brace 108 is joined to a cowl panel 110 of the vehicle body. In addition, the cowl-to brace 108 is placed to incline toward a lower side of the vehicle, from the front end toward a rear end, and the rear end is joined to the instrument panel R/F pipe 100 via a bracket 112.

A floor brace 114 is placed in an up-and-down direction of the vehicle, and supports the instrument panel R/F pipe 100 primarily in the up-and-down direction of the vehicle. A knee air bag 118 is attached between an upper end and a lower end of the floor brace 114, for protecting knees of passengers (driver) in a vehicle collision.

The upper end of the floor brace 114 is joined to the instrument panel R/F pipe 100 via the bracket 112. The floor brace 114 is placed to incline toward a rear side of the vehicle, from the upper end toward the lower end. The lower end is joined to a side wall 116A of a floor tunnel 116.

Specifically, a bolt joint portion 121A to be bolt-joined to the side wall 116A of the floor tunnel 116 in the width direction of the vehicle is provided at the lower end of the floor braced 114. With the bolt joint in the width direction, it becomes possible to suppress an up-and-down movement of the floor brace 114 due to a sheering stress acting on a bolt shaft portion when a load in a longitudinal direction (the up-and-down direction) is applied to the floor brace 114.

The upper end of the floor brace 114 and the bracket 112 are similarly bolt-joined in the width direction of the vehicle. Specifically, bolt joint portions 121B and 121C to be bolt-joined in the width direction of the vehicle are provided in the floor brace 114. By employing a two-point support using the two bolt joint portions 121B and 121C, it becomes possible to restrict a rotation of the floor brace 114.

That is, when the cowl-to brace 108 relatively moves in the front-and-rear direction of the vehicle with respect to the floor tunnel 116, a rotational load having a pivot on the bolt joint portion 121A is applied to the floor brace 114. If the floor brace 114 rotates with the bolt joint portion 121A as a pivot, a placement angle (relative angle) between the floor brace 114 and the bracket 112 would change. However, because the floor brace 114 and the bracket 112 are joined by the two bolt joint portions 121B and 121C, such a rotation is restricted.

Here, for example, in JP 2007-331614 A, there is employed a configuration, for the bolt joint as described above, in which a U-shaped hole with a partial cutout is employed for the bolt hole through which a stud bolt is inserted when skeleton members are joined with each other using the stud bolt and the bolt hole.

In the structure of the related art, during collision from the front side of the vehicle (hereinafter also referred to as a "front collision"), there remains room for improvement of the support of the floor brace. As exemplified in FIG. 19, at the time of front collision, an engine unit 120 is moved backward toward the rear side of the vehicle by an obstructing object (a barrier). With this process, the devices, panels, or the like behind the engine unit 120 are also moved backward. Specifically, an exhaust pipe 122 provided behind the engine unit 120 is moved backward while being deformed. Further, a dash panel 124 behind the exhaust pipe 122 is pushed by the exhaust pipe 122 and is moved backward. With this process, the cowl panel 110 joined to the upper end of the dash panel 124 and the cowl-to brace 108 joined to the cowl panel 110 are also moved backward. With the backward movement of the cowl-to brace 108, the upper end of the floor brace 114 joined to the rear end of the cowl-to brace 108 is also moved backward.

With the deformation and backward movement of the exhaust pipe 122, the floor tunnel 116 storing the exhaust pipe 122 is also deformed from the front side. Because the floor brace 114 having the lower end joined to the floor tunnel 116 has a structure in which the floor brace 114 extends in a manner to incline toward the rear side of the vehicle, from the upper end toward the lower end, the lower end of the floor brace 114 is placed slightly behind the front end of the floor tunnel. Therefore, at the time of the front collision, a certain time is required until the deformation reaches the bolt joint portion 121A at the lower end of the floor brace 114, and a backward-moving load may be applied to the upper end of the floor brace 114 before such deformation takes place. In this case, a rotational load F1 which is clockwise in a side view is applied to the floor brace 114, with the bolt joint portion 121A at the lower end as the pivot and the upper end as a point of application of the force.

When the bolt holes of the bolt joint portions 121B and 121C of the floor brace 114 have the U-shape, as in JP 2007-331614 A, there is a possibility that the floor brace 114 moves out of the bracket 112 by the rotational load F1, and it becomes unable to support the upper end of the floor brace 114.

On the other hand, when a closed circular shape is employed for the bolt holes of the bolt joint portions 121B and 121C of the floor brace 114, the rotation of the floor brace 114 is restricted by the two-point support as described above, and the floor brace 114 is deflected as exemplified in FIG. 19. With the deflection, a sheering force is applied to the bolt shaft portions of the bolt joint portions 121B and 121C. When the shock of the front collision is large, and an amount of deflection of the floor brace 114 is large, the sheering force applied to the bolt shaft portion may become excessive, rupturing or detachment of the bolt may occur, and it may become unable to support the upper end of the floor brace 114.

In either of the above-described cases, with the support of the upper end of the floor brace 114 being terminated, the support of the knee air bag 118 attached to the floor brace 114 also becomes unstable. In this manner, in the structure of the related art, there remains room for improvement from the viewpoint of the support of the floor brace 114, and, consequently, the support of the knee air bag 118 fixed on the floor brace 114.

An advantage of the present disclosure lies in the provision of a reinforcement structure at the front side of the vehicle cabin, which can sustain the support of the upper end of the floor brace 114 at the time of the front collision.

SUMMARY

According to one aspect of the present disclosure, there is provided a reinforcement structure at a front side of a vehicle cabin. The reinforcement structure comprises an instrument panel reinforcement pipe, a cowl-to brace, and a floor brace. The instrument panel reinforcement pipe extends in a width direction of a vehicle, and supports a steering column. The cowl-to brace extends in a front-and-rear direction of the vehicle, has a front end joined to a cowl panel placed at a farther front side of the vehicle than the instrument panel reinforcement pipe, and comprises a joint portion to be joined to the instrument panel reinforcement pipe, between the front end and a rear end. The floor brace has an upper end joined to the rear end of the cowl-to brace, is placed to incline toward a rear side of the vehicle, from the upper end toward a lower end, and has the lower end joined to a side wall of a floor tunnel. The rear end of the cowl-to brace and the upper end of the floor brace comprise overlap portions which overlap each other in the front-and-rear direction of the vehicle. A first bolt joint portion and a second bolt joint portion which are bolt-joined in the width direction of the vehicle are formed on each of the overlap portions of the cowl-to brace and the floor brace. A fragile portion which crosses between the first bolt joint portion and the second bolt joint portion is formed on one of the overlap portions of the cowl-to brace and the floor brace.

According to the structure described above, when a rotational load is applied to the floor brace at the time of the front collision, the fragile portion, between the first bolt joint portion and the second bolt joint portion which restrict the rotation, is ruptured before the other parts of the floor brace. In this process, one of the first bolt joint portion and the second bolt joint portion sustains the joint relationship between the floor brace and the cowl-to brace; that is, the support of the upper end of the floor brace. Further, with the rupturing of the fragile portion, the support of the upper end of the floor brace changes from the two-point support to a single-point support. Because of this, it becomes possible for the floor brace to rotate in response to the rotational load. As a result, the deflection of the floor brace is resolved, and rupturing at locations other than the fragile portion can be prevented.

According to another aspect of the present disclosure, a direction of crossing of the fragile portion may be non-parallel to an up-and-down direction of the vehicle.

According to the structure described above, by virtue of employing a structure in which the fragile portion tends to not receive the sheering force during an up-and-down vibration of the vehicle, rupturing of the fragile portion during normal driving of the vehicle can be suppressed.

According to another aspect of the present disclosure, there is provided a reinforcement structure at a front side of a vehicle cabin, comprising an instrument panel reinforcement pipe, a cowl-to brace, and a floor brace. The instrument panel reinforcement pipe extends in a width direction of a vehicle, and supports a steering column. The cowl-to brace extends in a front-and-rear direction of the vehicle, has a front end joined to a cowl panel placed at a farther front side of the vehicle than the instrument panel reinforcement pipe, and comprises a joint portion to be joined to the instrument panel reinforcement pipe, between the front end and a rear end. The floor brace has an upper end joined to the rear end of the cowl-to brace, is placed to incline toward a rear side of the vehicle, from the upper end toward a lower end, and has the lower end joined to a side wall of a floor tunnel. The rear end of the cowl-to brace and the upper end of the floor brace comprise overlap portions which overlap each other in the front-and-rear direction of the vehicle. A first bolt hole and a second bolt hole bored in the width direction of the vehicle are formed on one of the overlap portions of the cowl-to brace and the floor brace, and a first bolt shaft portion and a second bolt shaft portion which extend in the width direction of the vehicle are formed on the other of the overlap portions. One of the first bolt hole and the second bolt hole is a closed circular hole, and the other of the first bolt hole and the second bolt hole is a U-shaped hole with a partial cutout.

According to the structure described above, when the rotational load is applied to the floor brace at the time of the front collision, one of the bolt shaft portions moves out of the U-shaped hole, and it becomes possible for the floor brace to rotate with the circular hole as a pivot. Further, even after the rotation, the support by the circular hole and the bolt shaft portion is sustained, and, consequently, the support of the upper end of the floor brace is sustained.

ADVANTAGEOUS EFFECTS OF INVENTION

According to the present disclosure, the support of the upper end of the floor brace can be sustained at the time of the front collision.

BRIEF DESCRIPTION OF DRAWINGS

Embodiment(s) of the present disclosure will be described by reference to the following figures, wherein.

DESCRIPTION OF EMBODIMENTS

Figure 1:
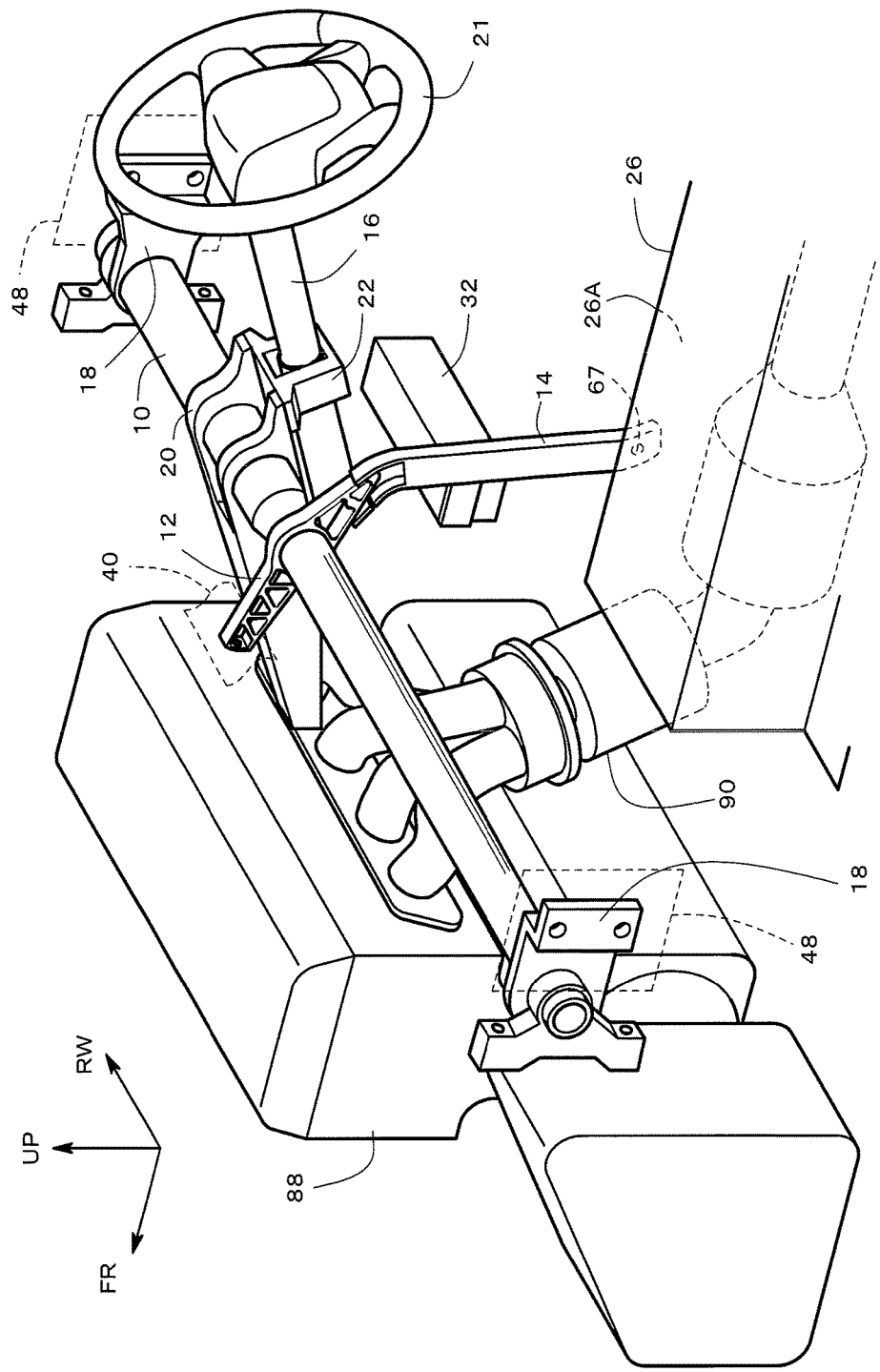
FIG. 1 is a perspective diagram exemplifying a reinforcement structure at a front side of a vehicle cabin according to a first embodiment of the present disclosure.

FIG. 1 exemplifies a reinforcement structure at a front side of a vehicle cabin according to a first embodiment of the present disclosure. In FIGS. 1~11, a front-and-rear direction of a vehicle is shown with an axis represented by FR, a width direction of the vehicle is shown with an axis represented by RW, and a vertical direction is shown by an axis represented by UP. FR is an abbreviation for "front," and the front-and-rear direction axis FR has a front direction of the vehicle as a positive direction. RW is an abbreviation for "right width," and the width direction axis RW has a right width direction as a positive direction. Further, the height axis UP has the upward direction as a positive direction.

As shown in FIG. 1, the FR axis, the RW axis, and the UP axis are orthogonal to each other. In the following, in the description of the reinforcement structure at the front side of the vehicle cabin of the present embodiment, the descriptions are given with reference to these three axes. For example, a "front end" refers to an end of an arbitrary member on the side of a positive direction of the FR axis, and a "rear end" refers to an end of an arbitrary member on the side of a negative direction of the FR axis. Similarly, an "inner width side" refers to a relative inner side in the width direction of the vehicle along the RW axis, and an "outer width side" refers to a relative outer side in the width direction of the vehicle along the RW axis. An "upper end" refers to an end of an arbitrary member on the side of a positive direction of the UP axis, and a "lower end" refers to an end of an arbitrary member on the side of a negative direction of the UP axis.

FIG. 1 exemplifies a vehicle interior structure including a front side of the vehicle, as viewed from a driver seat and a passenger seat of a right-steering-wheel automobile. A dash panel which separates the vehicle cabin and an engine compartment provided in front of the vehicle cabin is omitted in FIG. 1. Similarly, an instrument panel which separates a steering wheel 21 and an instrument panel R/F pipe 10 is omitted in the drawings.

The reinforcement structure at the front side of the vehicle cabin forms a part of a skeleton member of the vehicle, and comprises the instrument panel R/F pipe 10, a cowl-to brace 12, and a floor brace 14.

The instrument panel R/F pipe 10 is a circular tubular member extending in the vehicle width direction. On the instrument panel R/F pipe 10, a steering column 16, the cowl-to brace 12, the floor brace 14, an audio device, and a front air bag or the like (not shown) are attached.

The instrument panel R/F pipe 10 is supported and fixed on a vehicle body via a plurality of members. As a support structure in the width direction, respective ends of the instrument panel R/F pipe 10 are supported by front pillars 48, 48 via side brackets 18, 18. In addition, as a support structure primarily in the front-and-rear direction of the vehicle, the instrument panel R/F pipe 10 is supported on a cowl panel 40 via the cowl-to brace 12. Further, as a support structure primarily in the up-and-down direction of the vehicle, the instrument panel R/F pipe 10 is supported on a floor tunnel 26 via the floor brace 14.

Figure 2:
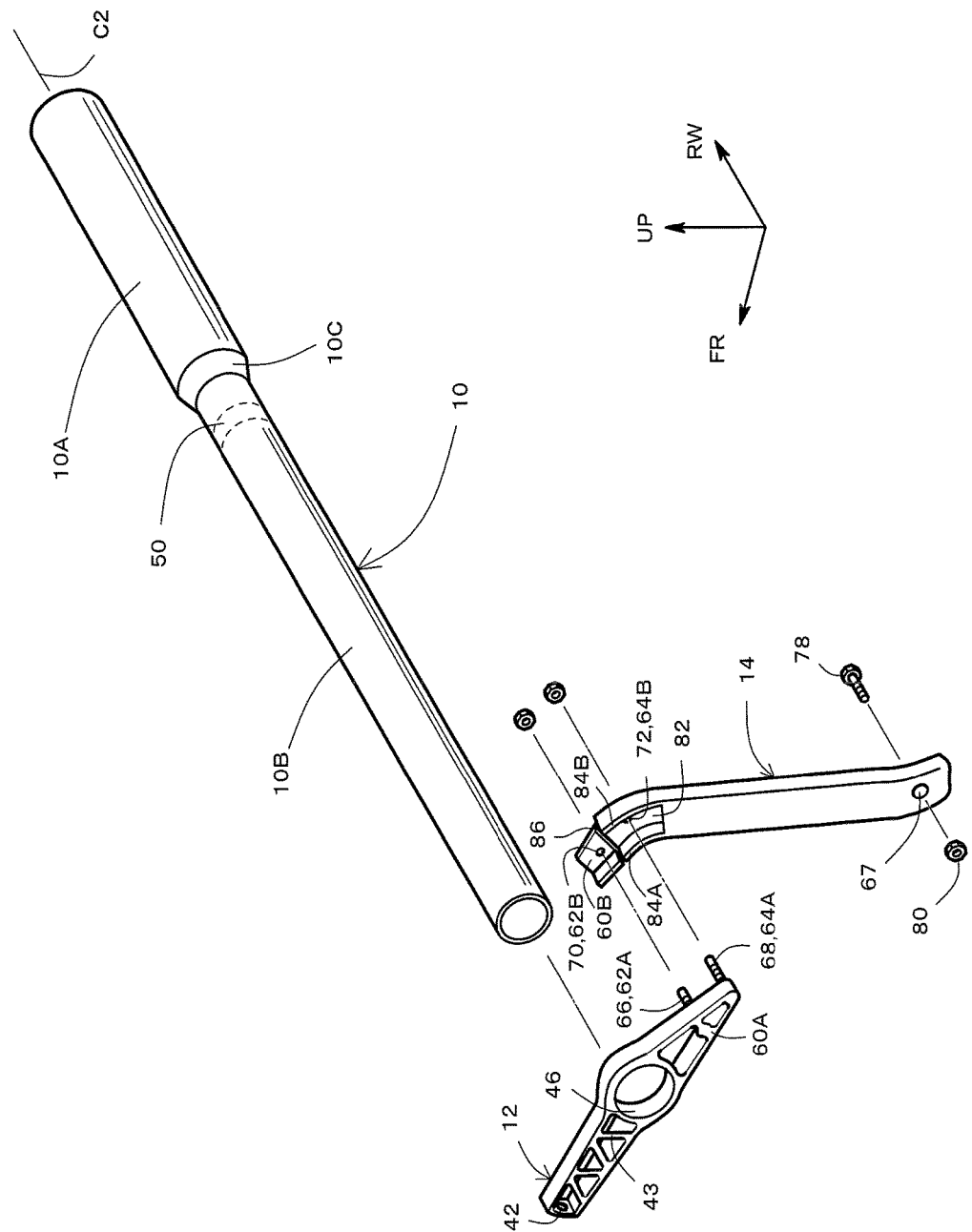
FIG. 2 is a perspective diagram exemplifying an instrument panel reinforcement pipe, a cowl-to brace, and a floor brace.

The instrument panel R/F pipe 10 is a pipe member, and is formed from, for example, a so-called rolled plate pipe in which an aluminum plate is bent and processed. In addition, as illustrated particularly in FIG. 2 in detail, the instrument panel R/F pipe 10 comprises a D-seat pipe 10A and a P-seat pipe 10B. The D-seat pipe 10A is a circular tubular member which is placed on the side of the driver seat, and the P-seat pipe 10B is a circular tubular member placed on the side of the passenger seat. The D-seat pipe 10A is formed to have a thicker diameter than that of the P-seat pipe 10B, so that the D-seat pipe 10A has an increased rigidity. As shown in FIG. 2, a compressed diameter part 10C is formed at an end of the D-seat pipe 10A on the side of the P-seat pipe, and, for example, the P-seat pipe 10B is inserted into the compressed diameter part 10C and the pipes are joined by a full-circumference welding or the like.

Referring back to FIG. 1, the instrument panel R/F pipe 10 supports the steering column 16. The steering column 16 is placed in the front-and-rear direction of the vehicle. More specifically, the steering column 16 is placed to incline from an upper part of the vehicle toward a lower part, from a rear side of the vehicle toward the front side. The steering column 16 is supported on the instrument panel R/F pipe 10 via a steering support 20 and a steering bracket 22. The steering wheel 21 is attached on a rear end of the steering column 16.

The cowl-to brace 12 is a reinforcement member extending in the front-and-rear direction of the vehicle. More specifically, the cowl-to brace 12 is placed to incline from the upper side toward the lower side, from the front side of the vehicle toward the rear side.

As shown in FIG. 2, the cowl-to brace 12 has a structure in which a plurality of ribs 43 are provided (stretched around) a lightened part, and a support hole 42 is formed on a front end thereof, through which a fastening member such as a bolt is inserted. The front end of the cowl-to brace 12 is fixed on the cowl panel 40 (refer to FIG. 1) placed on a farther front side than the instrument panel R/F pipe 10, via the support hole 42.

Further, a ring-shaped joint portion 46 to be joined with the instrument panel R/F pipe 10 is formed between the front end and the rear end of the cowl-to brace 12. The joint portion 46 is joined to the instrument panel R/F pipe 10 over the entire circumference. With such a joining, a rotation of the instrument panel R/F pipe 10 around a center axis C2 is suppressed.

For example, during assembly of the instrument panel R/F pipe 10 to the cowl-to brace 12, the joint portion 46 is fitted and inserted (or plugged) into the P-seat pipe 10B of the instrument panel R/F pipe 10. When the joint portion 46 (the cowl-to brace 12) is fitted and inserted into a predetermined joined location 50 of the P-seat pipe 10B, the joint portion 46 is joined with the P-seat pipe 10B (the joined location 50 thereof) over the entire circumference.

Figure 3:
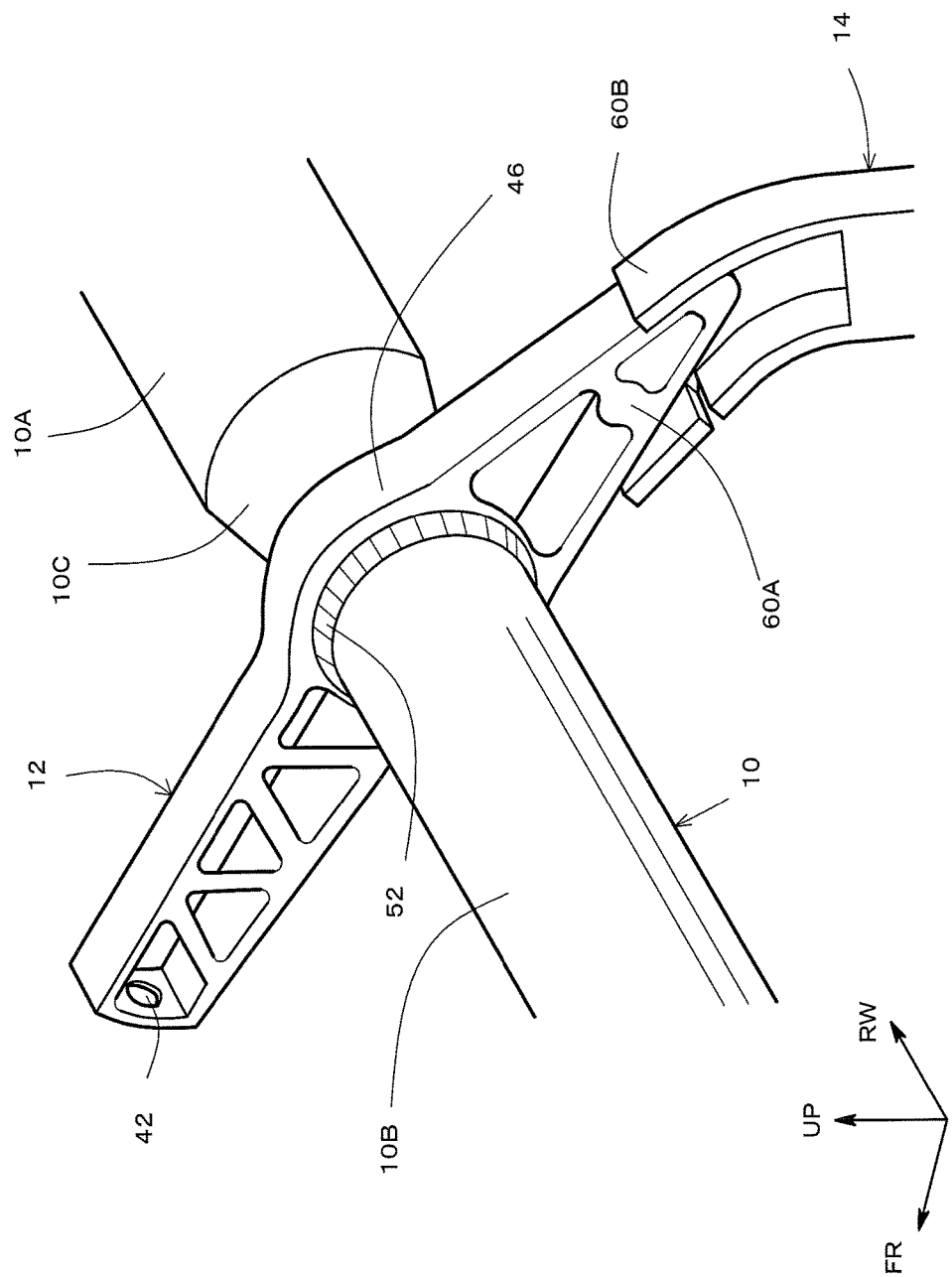
FIG. 3 is an enlarged perspective diagram of a periphery of a joint portion of a cowl-to brace.
Figure 4:
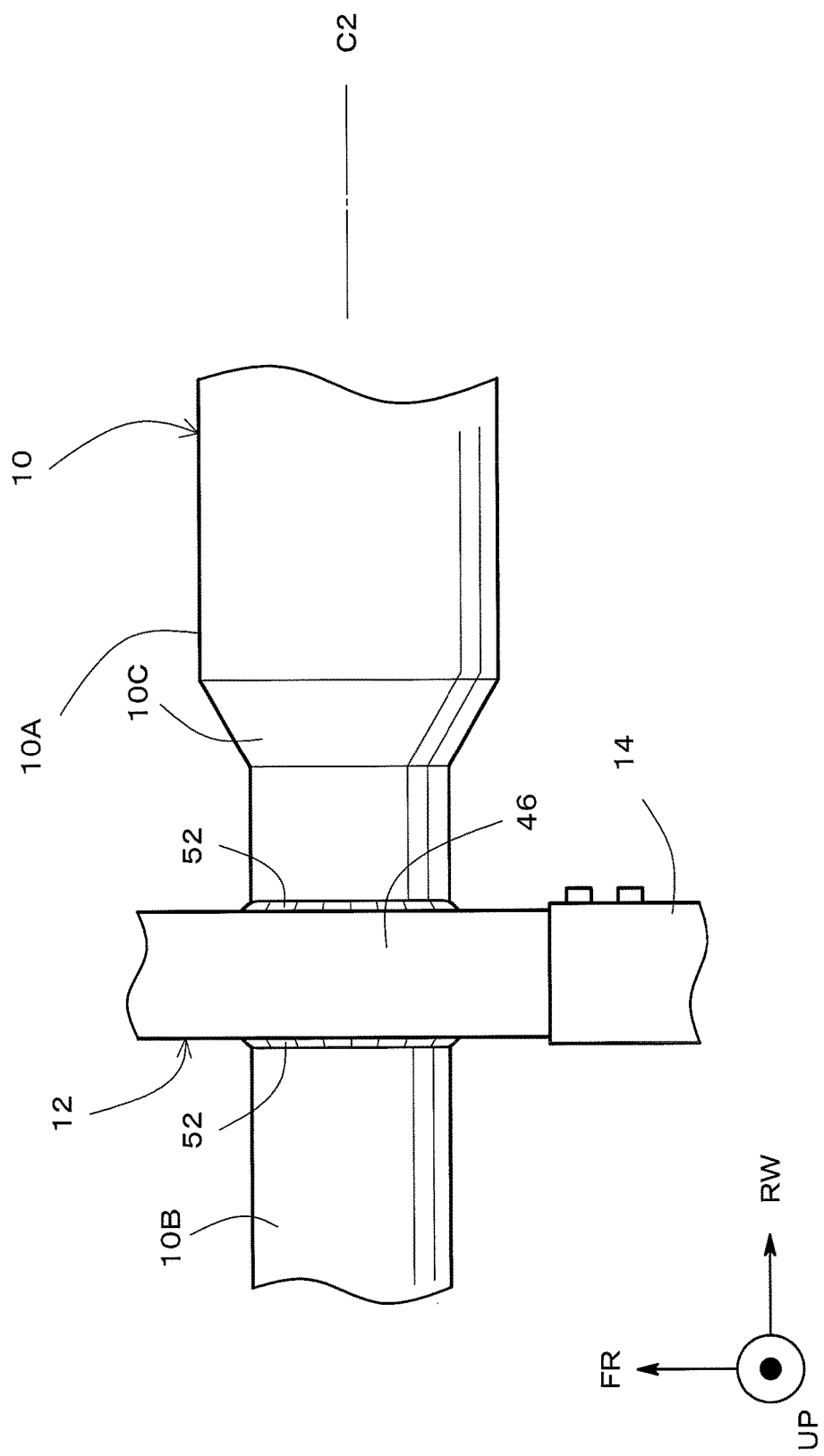
FIG. 4 is an enlarged plan view of a periphery of a joint portion of a cowl-to brace.

This joining may be executed, for example, by full-circumference welding (full-circumference fillet welding) as exemplified in FIGS. 3 and 4. A full-circumference welding portion 52 may be formed on both side surfaces of the cowl-to brace 12, as exemplified in FIG. 4. Alternatively, an outer circumferential surface of the joined location 50 of the P-seat pipe 10B and an inner circumferential surface of the joint portion 46 may be fixed over the entire circumference by an adhesive or by brazing.

Figure 5:
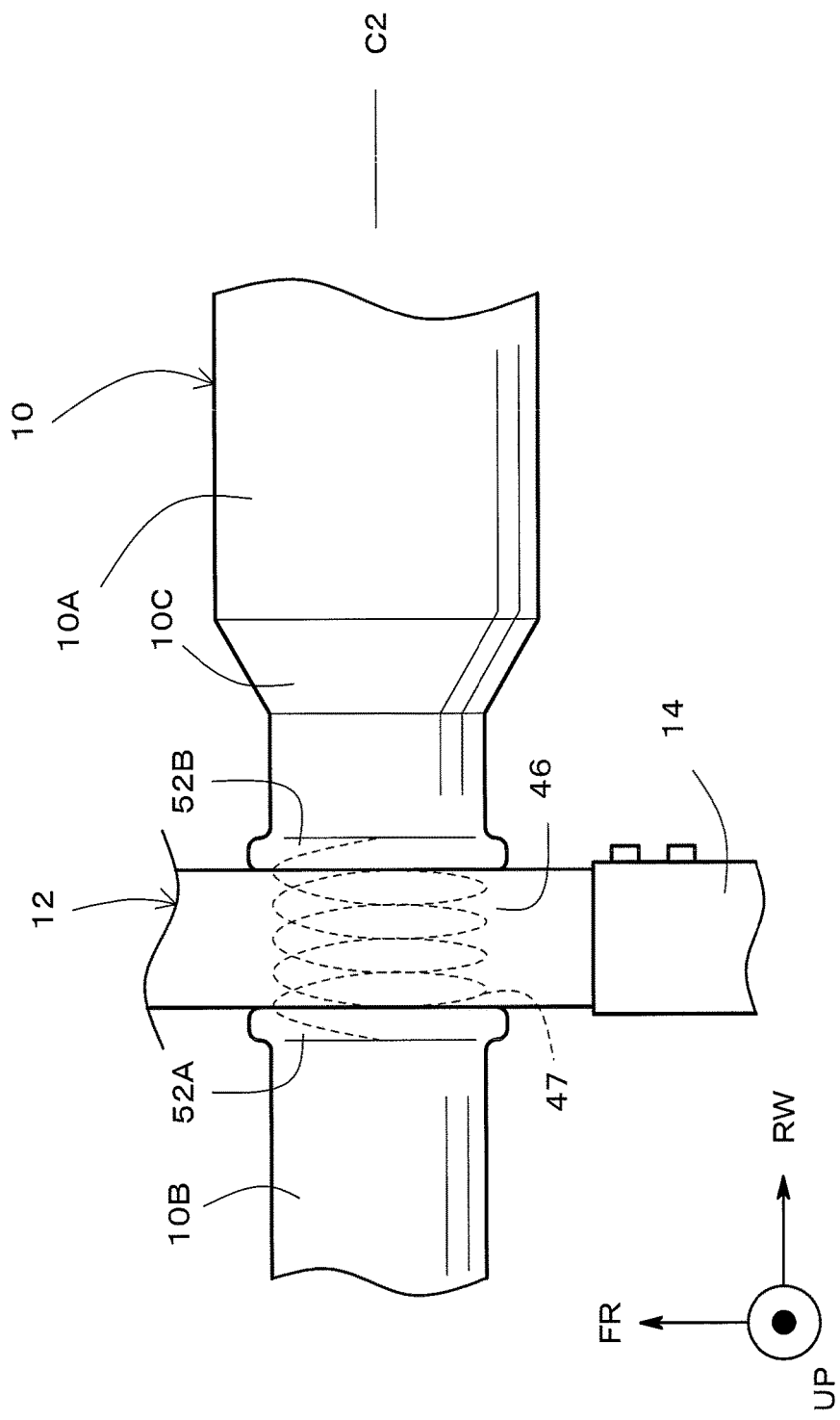
FIG. 5 is a diagram for explaining joining by electromagnetic molding.

Alternatively, as exemplified in FIG. 5, the joint portion 46 and the P-seat pipe 10B may be caulked over the entire circumference by an electromagnetic molding process. Because the electromagnetic molding process is a known art, the process will be only briefly described herein. An electromagnetic coil is inserted into a pipe member formed from a high-conductivity material such as aluminum and copper. Then, a large current of a pulse form is supplied to the electromagnetic coil, to cause a magnetic flux to be generated in the electromagnetic coil and to induce an induced current in the pipe member. In this process, a Lorentz force acts on the pipe member, in which the induced current is induced, toward an outer side in the radial direction, and, as a result, the pipe member is expanded.

For example, the electromagnetic molding process is executed in a state where the joint portion 46 of the cowl-to brace 12 is fitted and inserted into the P-seat pipe 10B, to the joined location 50 (refer to FIG. 2). In this process, for smooth fitting and insertion, an inner circumferential size of the joint portion 46 (a ring inner diameter) is formed slightly larger than an outer circumferential size of the P-seat pipe 10B. Further, an electromagnetic coil 47 is inserted to a position in the P-seat pipe 10B corresponding to the joined location 50. In this process, the electromagnetic coil 47 is formed in such a manner that a width of the electromagnetic coil 47 (a width in the RW axis direction) exceeds a width of the joint portion 46 (a width in the RW axis direction).

When a pulse current is supplied to the electromagnetic coil 47, a location of the P-seat pipe 10B covering the electromagnetic coil 47 is expanded (size expansion). That is, the sizes of the joined location 50 and the side portions of the joined location 50 in the width direction are expanded. In this structure, when the joint portion 46 attempts to rotate around the axis C2, a friction force acts between the joined location 50 and the inner circumferential surface of the joint portion 46 and between side surfaces of expanded portions 52A and 52B and a side surface of the joint portion 46, to thereby suppress the rotation of the joint portion 46.

Referring back to FIGS. 1 and 2, the rear end of the cowl-to brace 12 comprises an overlap portion 60A which overlaps the upper end of the floor brace 14 in the front-and-rear direction of the vehicle. For example, a part of the cowl-to brace 12 at a rear side of the joint potion 46 has a pointed shape in which a width in the up-and-down direction is gradually narrowed toward the rear side, and the rearmost side is the overlap portion 60A.

The overlap portion 60A comprises a first bolt joint portion 62A and a second bolt joint portion 64A. As will be described later, the first bolt joint portion 62A and the second bolt joint portion 64A of the cowl-to brace 12 are bolt-joined to a first bolt joint portion 62B and a second bolt joint portion 64B of the floor brace 14 in the width direction of the vehicle. The first bolt joint portion 62A and the second bolt joint portion 64A of the cowl-to brace 12 are provided with a predetermined gap therebetween along a longitudinal direction of the cowl-to brace 12 (that is, along the front-and-rear direction of the vehicle). In FIG. 2, stud bolts 66 and 68 extending in the width direction of the vehicle are exemplified as the first bolt joint portion 62A and the second joint portion 64A.

As will be described later, as an alternative configuration of FIG. 2, a configuration may be employed in which the stud bolts 66 and 68 are employed as the first bolt joint portion 62B and the second bolt joint portion 64B of an overlap portion 60B of the floor brace 14. In this case, bolt holes 70 and 72 bored in the width direction of the vehicle may be employed as the first bolt joint portion 62A and the second bolt joint portion 64A of the cowl-to brace 12.

The floor brace 14 is a reinforcement member extending in the up-and-down direction of the vehicle. More specifically, the floor brace 14 is placed to incline toward the rear side of the vehicle, from the upper end of the vehicle toward the lower end. In FIGS. 1~17, only a D-seat floor brace provided on the side of the driver seat is shown as the floor brace, and a P-seat floor brace provided on the side of the passenger seat is omitted.

Figure 6:
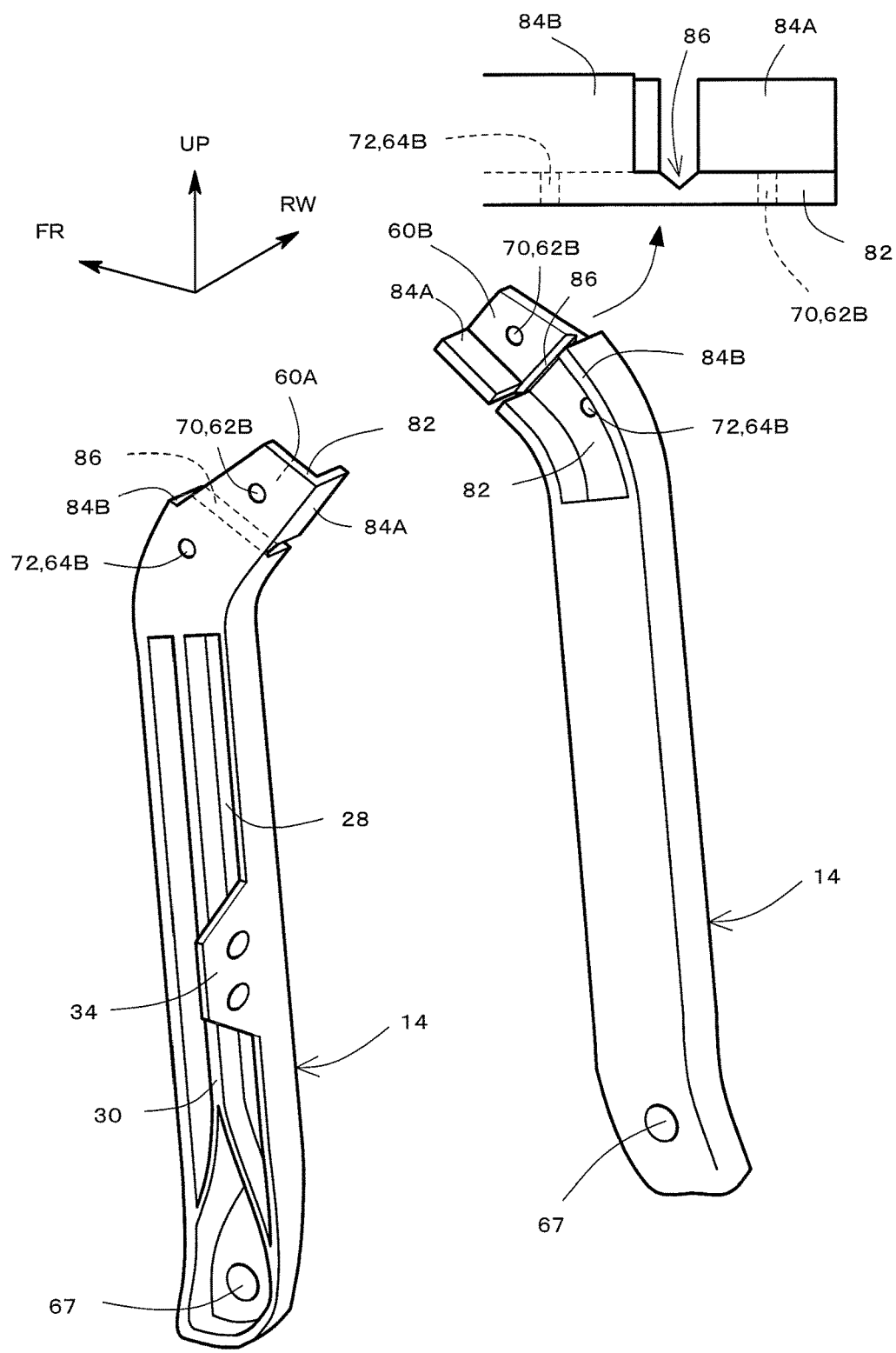
FIG. 6 is a perspective diagram exemplifying a structure of a back side and a front side of a floor brace.

The floor brace 14 (D-seat floor brace) is fixed on the cowl-to brace 12 and the floor tunnel 26. FIG. 6 shows a perspective diagram of both sides (front side and back side) of the floor brace 14. As exemplified, the floor brace 14 has a V-shape (or a """ shape) structure or a boomerang structure in the side view, and comprises an upper side portion extending relatively in the front-and-rear direction of the vehicle, and a lower side portion extending relatively in the up-and-down direction of the vehicle.

Further, the floor brace 14 has a lightened part 28 which is thinned in the vehicle width direction, and a rib 30 is formed on the lightened part 28 along a longitudinal direction thereof. In addition, a flange 34 for supporting and fixing a knee air bag 32 (refer to FIG. 1) is formed between the upper end and the lower end of the floor brace 14, for example, at an intermediate portion of the lightened part 28 in the longitudinal direction.

A lower end of the floor brace 14 is supported and fixed on a side wall 26A of the floor tunnel 26, as shown in FIG. 1. As exemplified in FIGS. 1 and 6, a third bolt joint portion 67 is provided at the lower end of the floor brace 14. The third bolt joint portion 67 is joined to the side wall 26A of the floor tunnel 26 in the width direction of the vehicle. For example, the third bolt joint portion 67 is formed from a bolt hole bored in the width direction of the vehicle. In addition, a bolt hole bored in the width direction of the vehicle is also formed on the side wall 26A of the floor tunnel 26. In a state where the two bolt holes are aligned, a shaft portion of a bolt 78 as shown in FIG. 2 is inserted into the bolt holes, and the shaft portion protruding from the bolt hole is screwed into a nut 80.

An upper end of the floor brace 14 is joined to the rear end of the cowl-to brace 12. Specifically, the upper end of the floor brace 14 comprises the overlap portion 60B which overlaps the overlap portion 60A of the cowl-to brace 12. The overlap portion 60B may comprise, for example, a bottom wall 82 and side walls 84A and 84B provided in a standing manner on both sides of the bottom wall 82. In a space having a U-shape in its cross section, formed by the bottom wall 82 and the side walls 84A and 84B, the overlap portion 60A of the cowl-to brace 12 is stored.

At least one of the side walls 84A and 84B may be terminated partway, not extending to a tip of the upper end of the floor brace 14. With such a configuration, at the time of the front collision to be described later, the rotation of the floor brace 14 with respect to the cowl-to brace 12 is not blocked by the side walls 84A and 84B. In addition, both the side walls 84A and 84B may be terminated in a line of extension of a fragile portion 86 to be described later. Such a configuration facilitates rupturing of the fragile portion 86 during the front collision.

On the overlap portion 60B of the floor brace 14, the first bolt joint portion 62B and the second bolt joint portion 64B are provided corresponding to the first bolt joint portion 62A and the second bolt joint portion 64A of the cowl-to brace 12. The first bolt joint portion 62B and the second bolt joint portion 64B of the floor brace 14 may be, for example, the bolt holes 70 and 72 bored in the width direction of the vehicle.

As will be described later, as an alternative configuration of FIG. 2, the bolt holes 70 and 72 may be employed as the first bolt joint portion 62A and the second bolt joint portion 64A of the cowl-to brace 12. In this case, the stud bolts 66 and 68 may be employed as the first bolt joint portion 62B and the second bolt joint portion 64B of the floor brace 14. The first bolt joint portion 62B and the second bolt joint portion 64B of the floor brace 14 are formed with a predetermined gap therebetween along the longitudinal direction of the floor brace 14.

By the upper end of the floor brace 14 being two-point supported by the first bolt joint portion 62B and the second bolt joint portion 64B, it become possible to restrict the rotation of the floor brace 14 when the cowl-to brace 12 and the floor tunnel 26 move relative to each other.

In addition, the fragile portion 86 is provided on the overlap portion 60B of the floor brace 14. The fragile portion 86 is a particular element which is intentionally formed to have, when a bending load is applied to ends of a rod-shaped member such as the floor brace 14, a lower bending strength and a lower sheering strength compared to the other parts of the rod-shaped member. The fragile portion 86 is formed to cross between the first bolt joint portion 62B and the second bolt joint portion 64B. For example, while the first bolt joint portion 62B and the second bolt joint portion 64B are placed along the longitudinal direction of the floor brace 14, the fragile portion 86 is formed along a short-side direction of the floor brace 14. For example, the fragile portion 86 is provided over the ends of the floor brace 14 in the short-side direction.

As exemplified in a side view at a top right of FIG. 6, a thickness of the fragile portion 86 is formed thin compared to the bottom wall 82. For example, the thickness of the fragile portion 86 is formed to be about 80% of the thickness of the bottom wall 82. In addition, as exemplified in FIG. 6, the fragile portion 86 is formed from a groove extending in the short-side direction of the floor brace 14.

Figure 7:
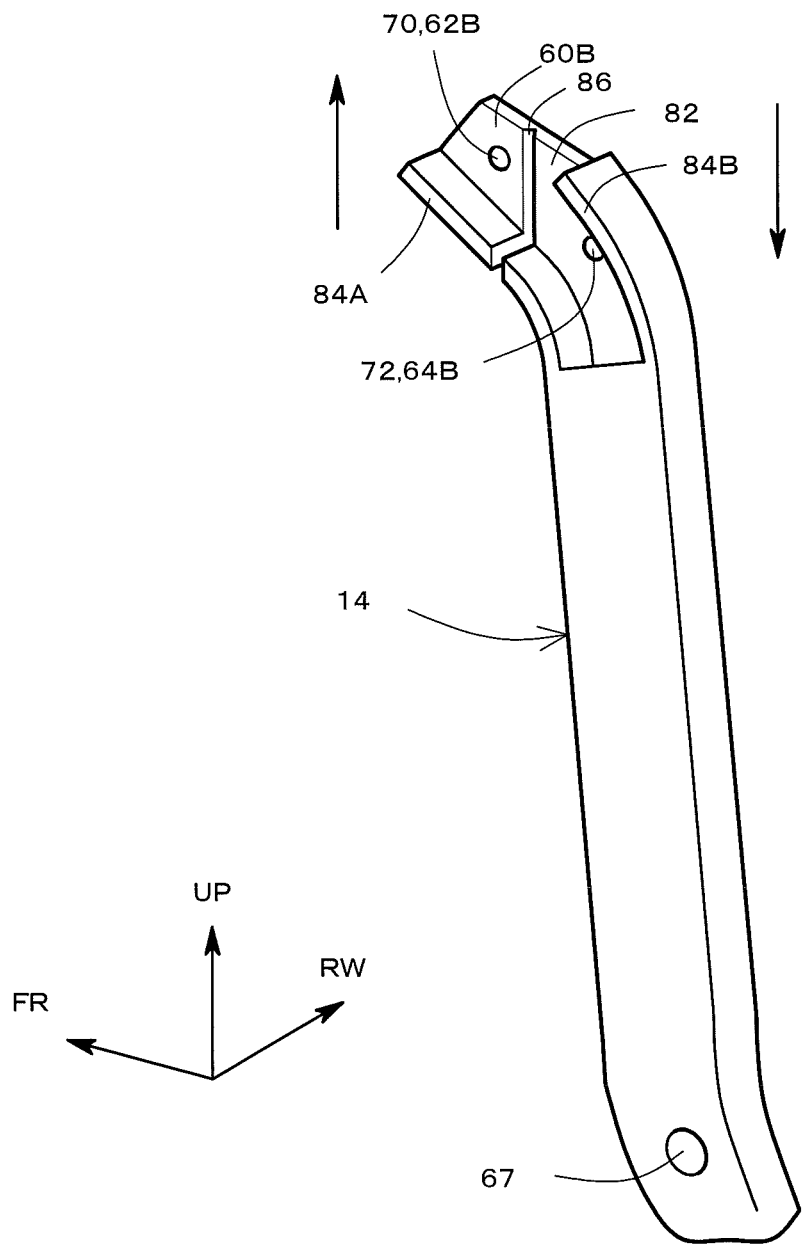
FIG. 7 is a diagram for explaining an input of a load to a fragile portion when a crossing direction of the fragile portion is an up-and-down direction of a vehicle.

A direction of extension of the fragile portion 86 (crossing direction) is desirably non-parallel to the up-and-down direction of the vehicle. FIG. 7 shows an example configuration where the fragile portion 86 extends parallel to the up-and-down direction of the vehicle. The vehicle vibrates upward and downward due to unevenness of a road surface. In this process, a sheering force in the up-and-down direction is applied to the fragile portion 86. When the thin fragile portion 86 extends in parallel to the sheering force, occurrence of rupturing of the fragile portion 86 during a normal driving of the vehicle becomes easier. In consideration of this, it is desirable that the fragile portion 86 extend (cross) non-parallel to the up-and-down direction of the vehicle.

<Behavior at Front Collision>

Figure 8:
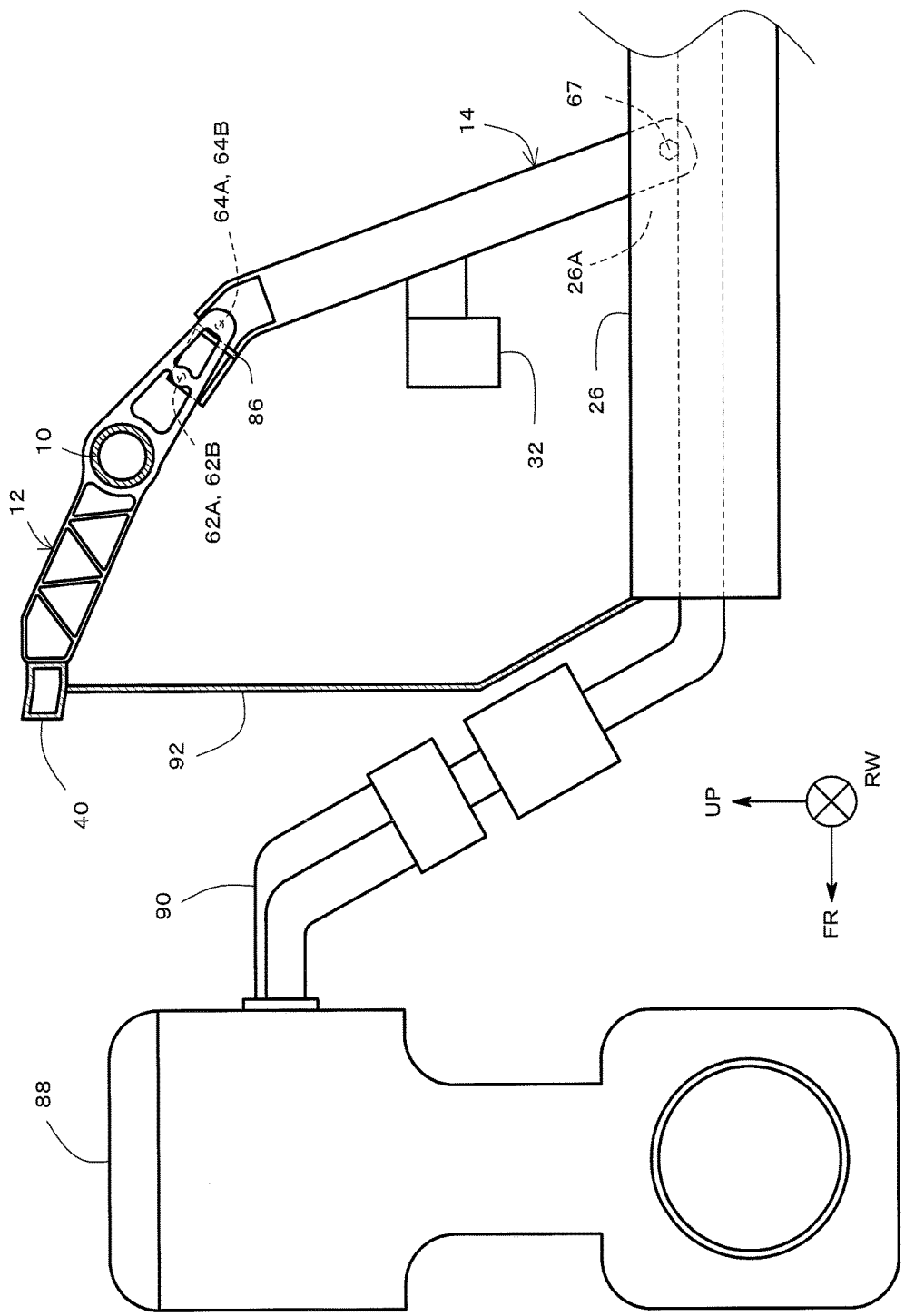
FIG. 8 is a side view exemplifying a reinforcement structure at a front side of a vehicle cabin and a peripheral structure thereof before a front collision.
Figure 9:
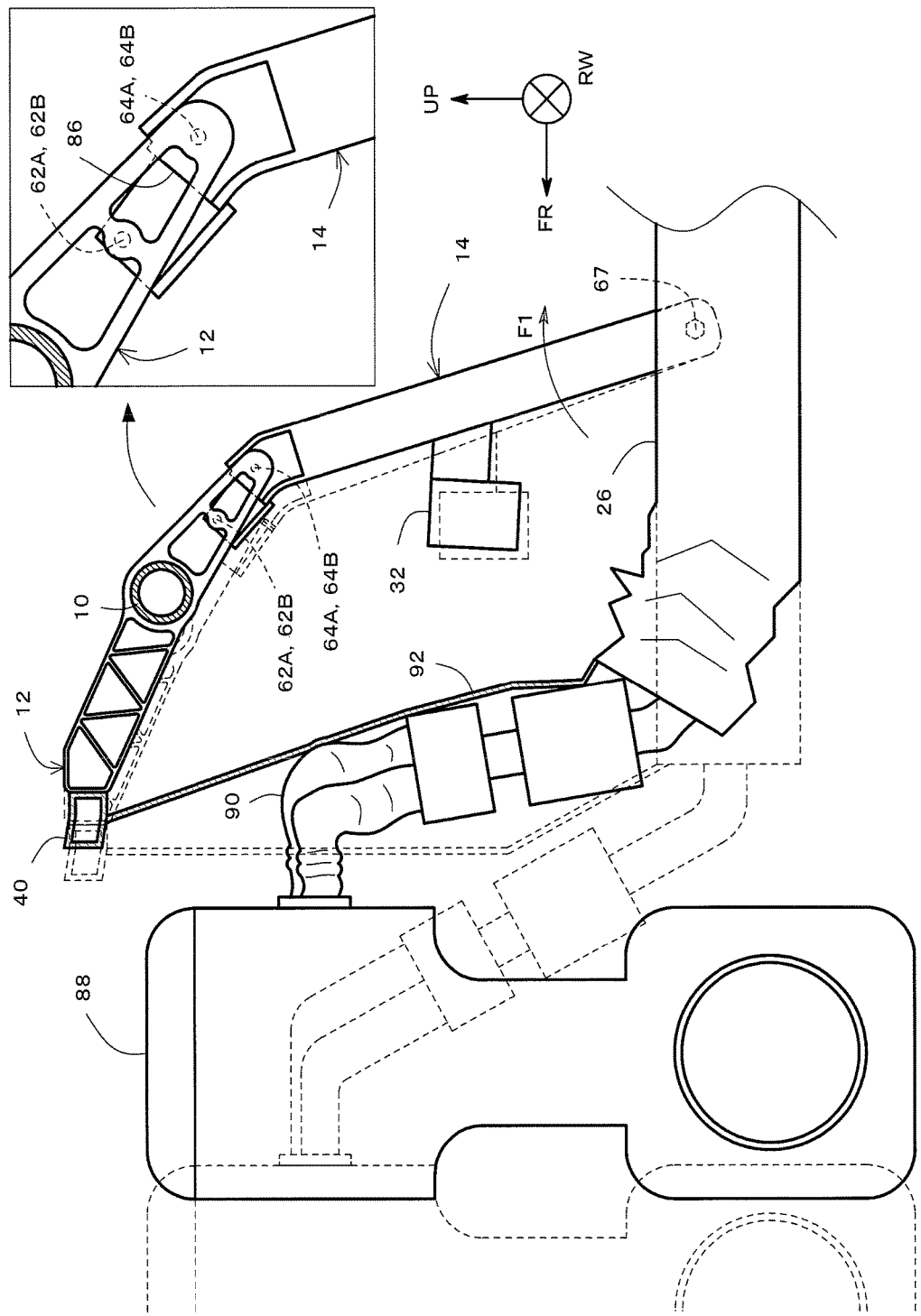
FIG. 9 is a side view exemplifying the reinforcement structure at the front side of the vehicle cabin and the peripheral structure thereof at the time of the front collision.

A behavior at the time of the front collision of the reinforcement structure at the front side of the vehicle cabin according to the first embodiment will now be described with reference to FIGS. 8 and 9. FIG. 8 exemplifies the reinforcement structure at the front side of the vehicle cabin and peripheral structures thereof before a front collision, and FIG. 9 shows the reinforcement structure at the front side of the vehicle cabin and the peripheral structures thereof at the time of the front collision.

At the time of the front collision, an engine unit 88 in front of the reinforcement structure at the front side of the vehicle cabin is moved backward toward the rear side of the vehicle by an obstructing object (a barrier). With this process, an exhaust pipe 90 provided behind the engine unit 88 is moved backward while being deformed. Further, a dash panel 92 behind the exhaust pipe 90 is pushed by the exhaust pipe 90 and is moved backward. As a result, the cowl panel 40 joined to the upper end of the dash panel 92, and the cowl-to brace 12 joined to the cowl panel 40 are moved backward. With the backward movement of the cowl-to brace 12, the upper end of the floor brace 14 joined to the rear end of the cowl-to brace 12 is also moved backward.

With the deformation and the backward movement of the exhaust pipe 90, the floor tunnel 26 which stores the exhaust pipe 90 is also deformed from the front side. Because the floor brace 14 has the structure in which the floor brace 14 is inclined toward the rear side of the vehicle, from the upper end toward the lower end of the floor brace 14, the third bolt joint portion 67 at the lower end is placed slightly behind the front end of the floor tunnel 26. Therefore, there is a slight time delay from the time of occurrence of the front collision to the time when the deformation of the floor tunnel 26 reaches the third bolt joint portion 67, and there may be cases where a backward-moving load is applied to the upper end of the floor brace 14 during this time delay period. In this case, a rotational load F1 in the clockwise direction in the side view is applied to the floor brace 14, having the third bolt joint portion 67 at the lower end of the floor brace 14 as a pivot and the upper end of the floor brace 14 as the point of application of force.

The floor brace 14 having its rotation restricted by the upper end thereof being two-point supported is deflected due to the input of the rotational load F1. In addition, with the deflection, a load is applied to the fragile portion 86. For example, a sheering force in a direction of a tangential line of the rotational load F1 is applied to the fragile portion 86. When the amount of deflection of the floor brace 14 due to the front collision becomes large, the fragile portion 86 ruptures before the other parts of the floor brace 14. With this rupturing, the floor brace 14 is released from the joint relationship by the first bolt joint portions 62A and 62B, and the floor brace 14 is supported in a single-point support by the second bolt joint portions 64A and 64B. Because the form of support changes from the two-point support to the single-point support, it becomes possible for the floor brace 14 to rotate in response to the backward movement of the cowl-to brace 12. With this rotation, the deflection of the floor brace 14 is resolved, and further rupturing is suppressed. In other words, the support of the upper end of the floor brace 14 is sustained.

<Alternative Configuration of First Embodiment>

In the example configuration of FIGS. 1~9, the stud bolts 66 and 68 are employed as the first bolt joint portion 62A and the second bolt joint portion 64A of the cowl-to brace 12, and the bolt holes 70 and 72 are employed as the first bolt joint portion 62B and the second bolt joint portion 64B of the floor brace 14. Alternatively, these elements may be exchanged as suited. For example, the bolt holes 70 and 72 may be employed as the first bolt joint portion 62A and the second bolt joint portion 64A of the cowl-to brace 12, and the stud bolts 66 and 68 may be employed as the first bolt joint portion 62B and the second bolt joint portion 64B of the floor brace 14. Further, a configuration may be employed in which the bolt hole 70 and the stud bolt 68 are employed as the first bolt joint portion 62A and the second bolt joint portion 64A of the cowl-to brace 12, respectively, and the stud bolt 66 and the bolt hole 72 are employed as the first bolt joint portion 62B and the second bolt joint portion 64B of the floor brace 14, respectively.

Figure 10:
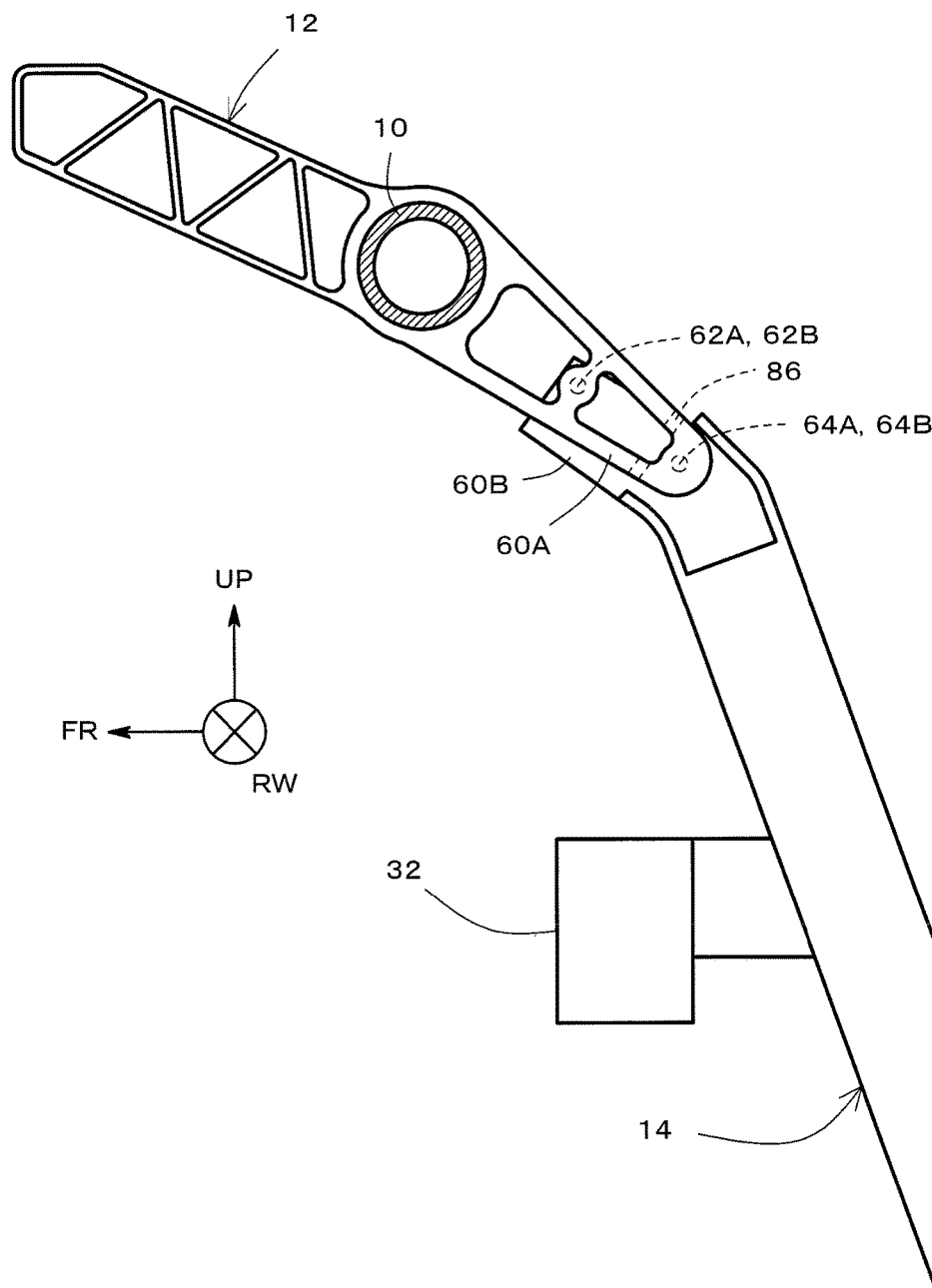
FIG. 10 is a side view showing an example configuration in which a fragile portion is provided on a cowl-to brace.
Figure 11:
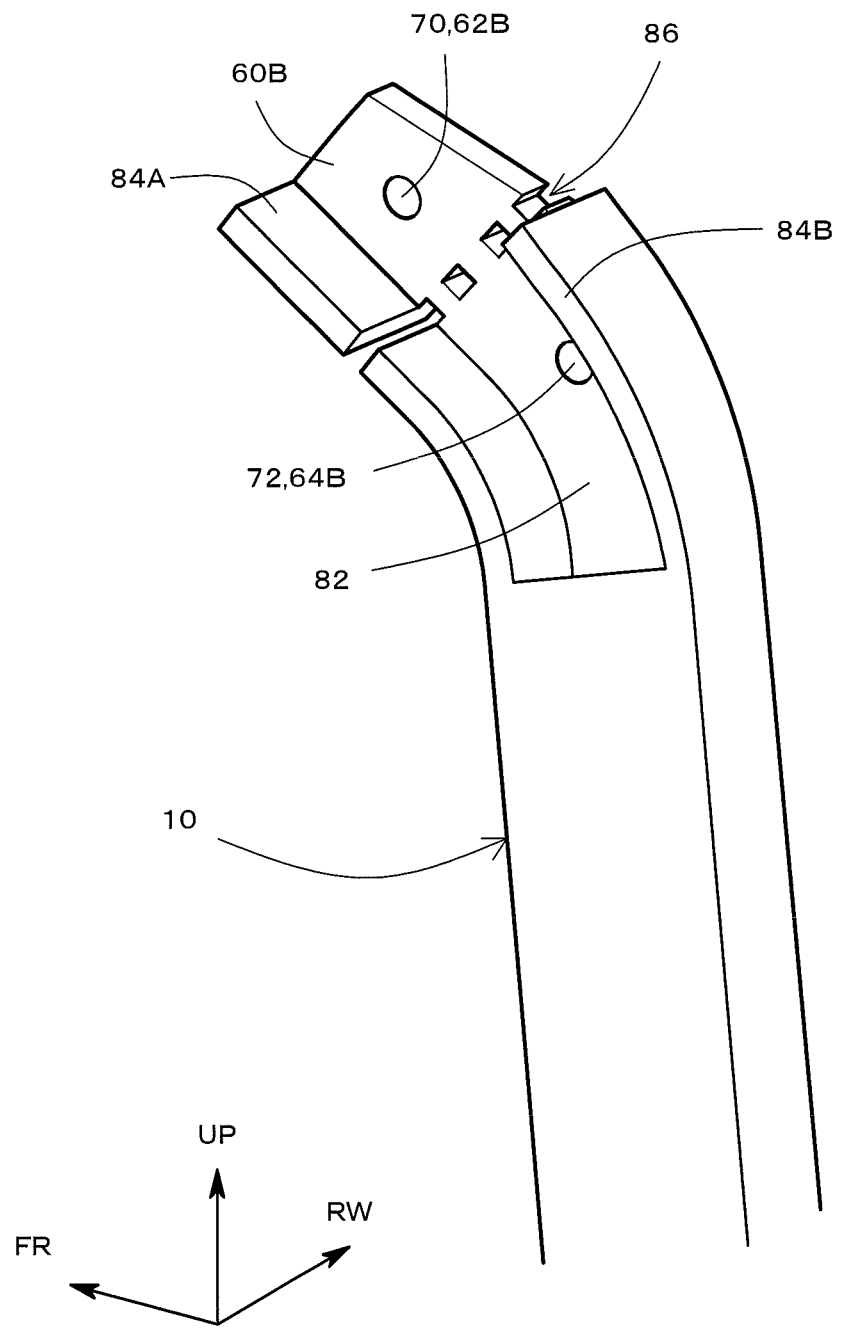
FIG. 11 is a perspective diagram exemplifying an alternative configuration of a fragile portion.

Moreover, in the example configuration of FIGS. 1~9, the fragile portion 86 is provided on the floor brace 14, but alternatively, as shown in FIG. 10, a configuration may be employed in which the fragile portion 86 is provided on the cowl-to brace 12. In summary, it is sufficient that the fragile portion 86 be provided between the first bolt joint portion 62B and the second bolt joint portion 64B provided on the overlap portion 60B of the floor brace 14, or between the first bolt joint portion 62A and the second bolt joint portion 64A provided on the overlap portion 60A of the cowl-to brace 12.

Furthermore, in the example configuration of FIGS. 1~9, the fragile portion 86 is formed from a groove extending in the short-side direction of the floor brace 14, but the structure is not limited to such a form. For example, as exemplified in FIG. 11, a so-called perforation structure, in which holes are intermittently bored along the short-side direction, may be employed as the structure of the fragile portion 86.

Second Embodiment

A reinforcement structure at a front side of a vehicle cabin according to a second embodiment of the present disclosure will now be described with reference to FIGS. 12~17. Members and structures identical to those of the first embodiment are assigned the same reference numerals, and will not be described again.

Figure 12:
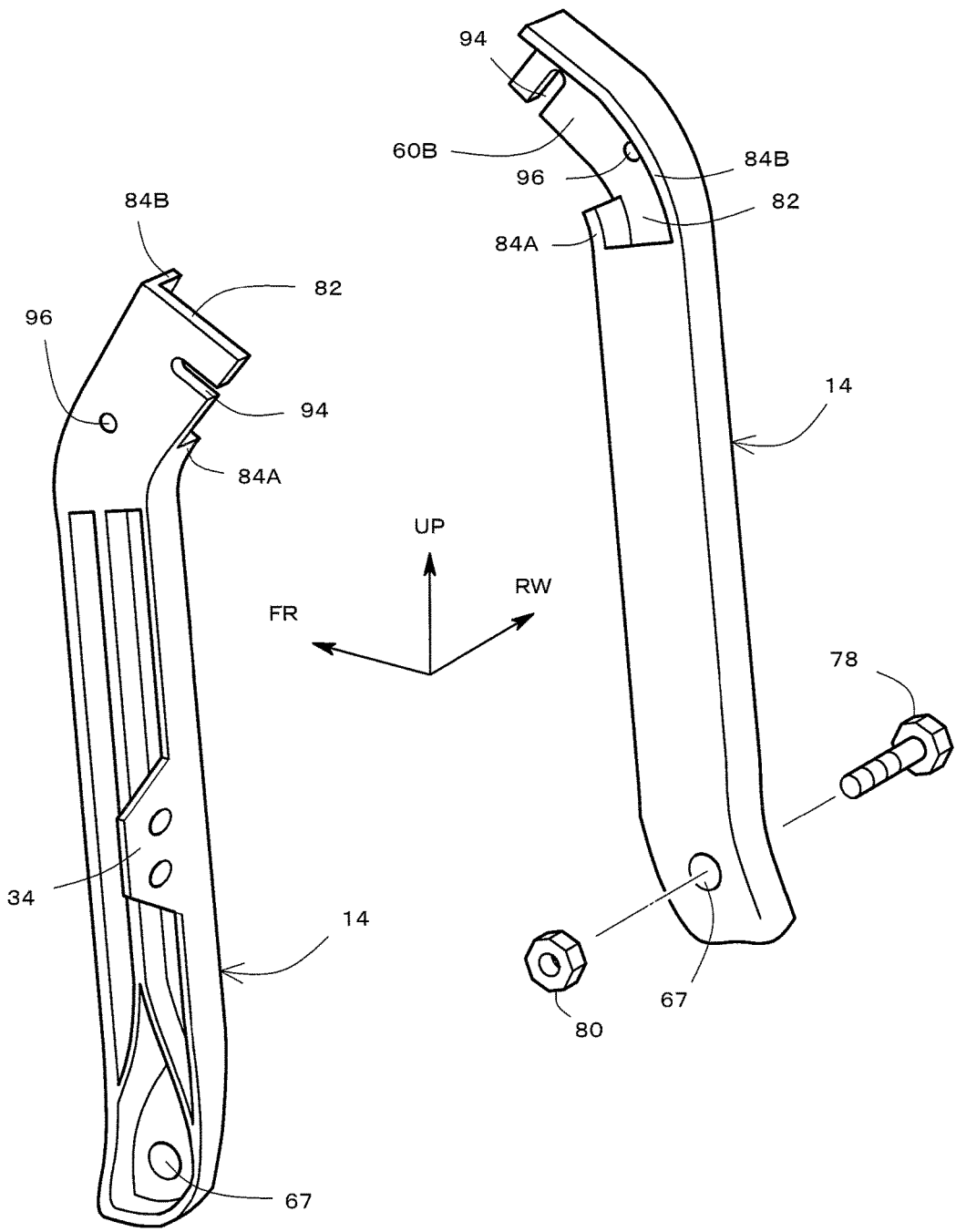
FIG. 12 is a perspective diagram exemplifying a structure of a floor brace according to a second embodiment of the present disclosure.

FIG. 12 shows a perspective view of both sides of the floor brace 14 according to the second embodiment. As a difference from the first embodiment, a first bolt hole 94 and a second bolt hole 96 bored in the width direction of the vehicle are formed on the overlap portion 60B of the floor brace 14.

One of the first bolt hole 94 and the second bolt hole 96 is a closed circular hole, and the other is a U-shaped hole having a portion thereof being cut out. In FIG. 12, a configuration is shown in which the first bolt hole 94 is formed as the U-shaped hole, and the second bolt hole 96 is formed as the circular hole. A direction of the cutout of the U-shaped hole is set at a direction to enable rotation of the floor brace 14 at the time of the front collision (clockwise direction in the side view). For example, as exemplified in FIG. 12, the U-shaped hole is formed to cut out in a slanted downward direction of the vehicle.

Figure 13:
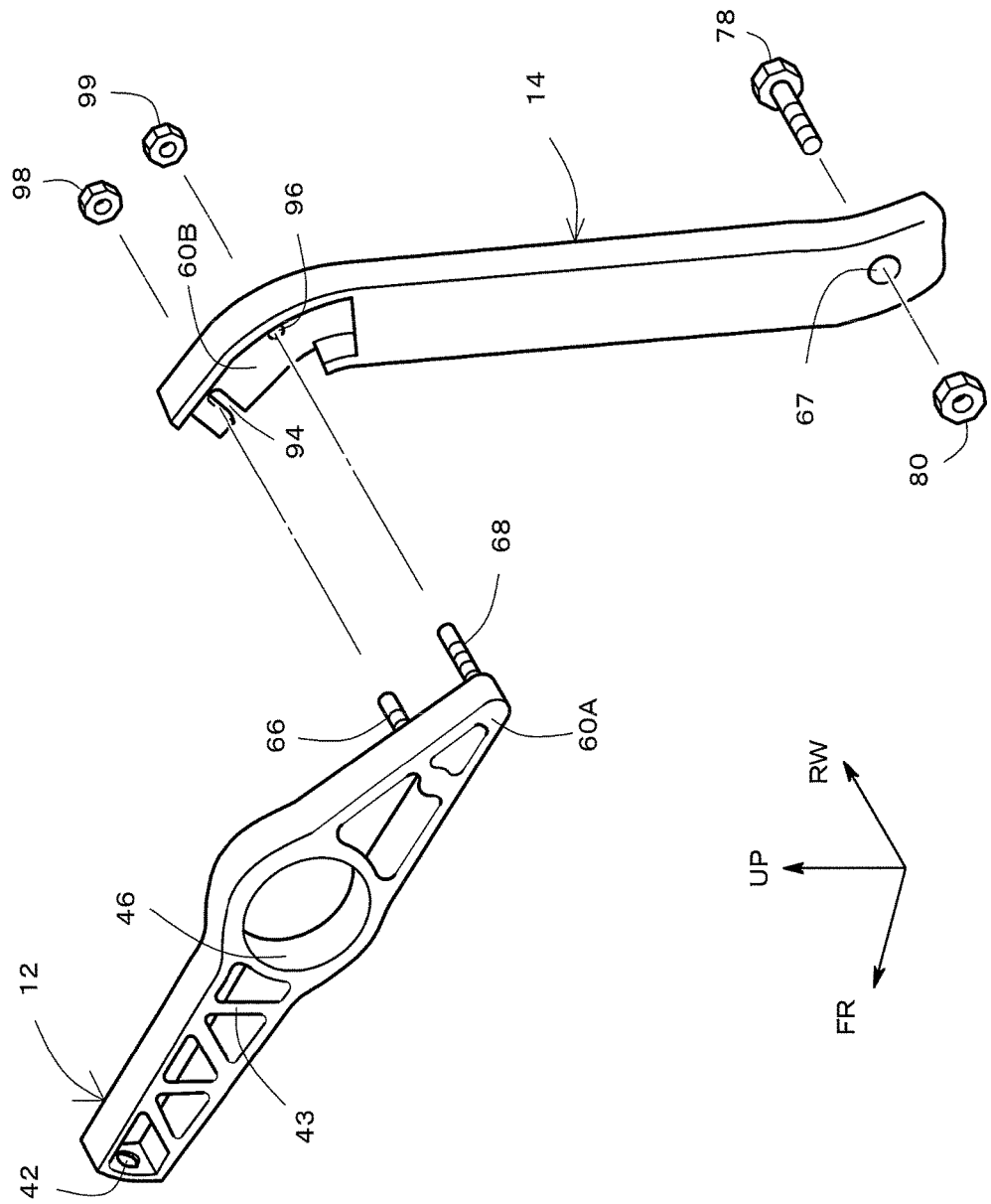
FIG. 13 is a perspective diagram exemplifying structures of the floor brace and a cowl-to brace according to the second embodiment of the present disclosure.

In addition, as exemplified in FIG. 13, stud bolts 66 (a first bolt shaft portion) and 68 (a second bolt shaft portion) extending in the width direction of the vehicle are formed on the overlap portion 60A of the cowl-to brace 12, corresponding to the first bolt hole 94 and the second bolt hole 96.

As exemplified in FIG. 13, during assembly, the stud bolt 66 of the cowl-to brace 12 is inserted into the first bolt hole 94, and the stud bolt 68 is inserted into the second bolt hole 96. Further, shaft portions of the stud bolts 66 and 68 protruding from the first bolt hole 94 and the second bolt hole 96 are screw-engaged with nuts 98 and 99.

With regard to the fastening of the nut 98 to the stud bolt 66 inserted into the first bolt hole 94 which is the U-shaped hole, the fastening is desirably a fastening which suppresses the rotation of the floor brace 14 during normal driving, and which allows the rotation of the floor brace 14 at the time of the front collision. For example, the screwing of the nut 98 with respect to the stud bolt 66 inserted into the first bolt hole 94 is a semi-rigid joining which is an intermediate joint between a pin joint which allows rotation and a rigid joint which completely prevents the rotation.

<Behavior at Front Collision>

Figure 14:
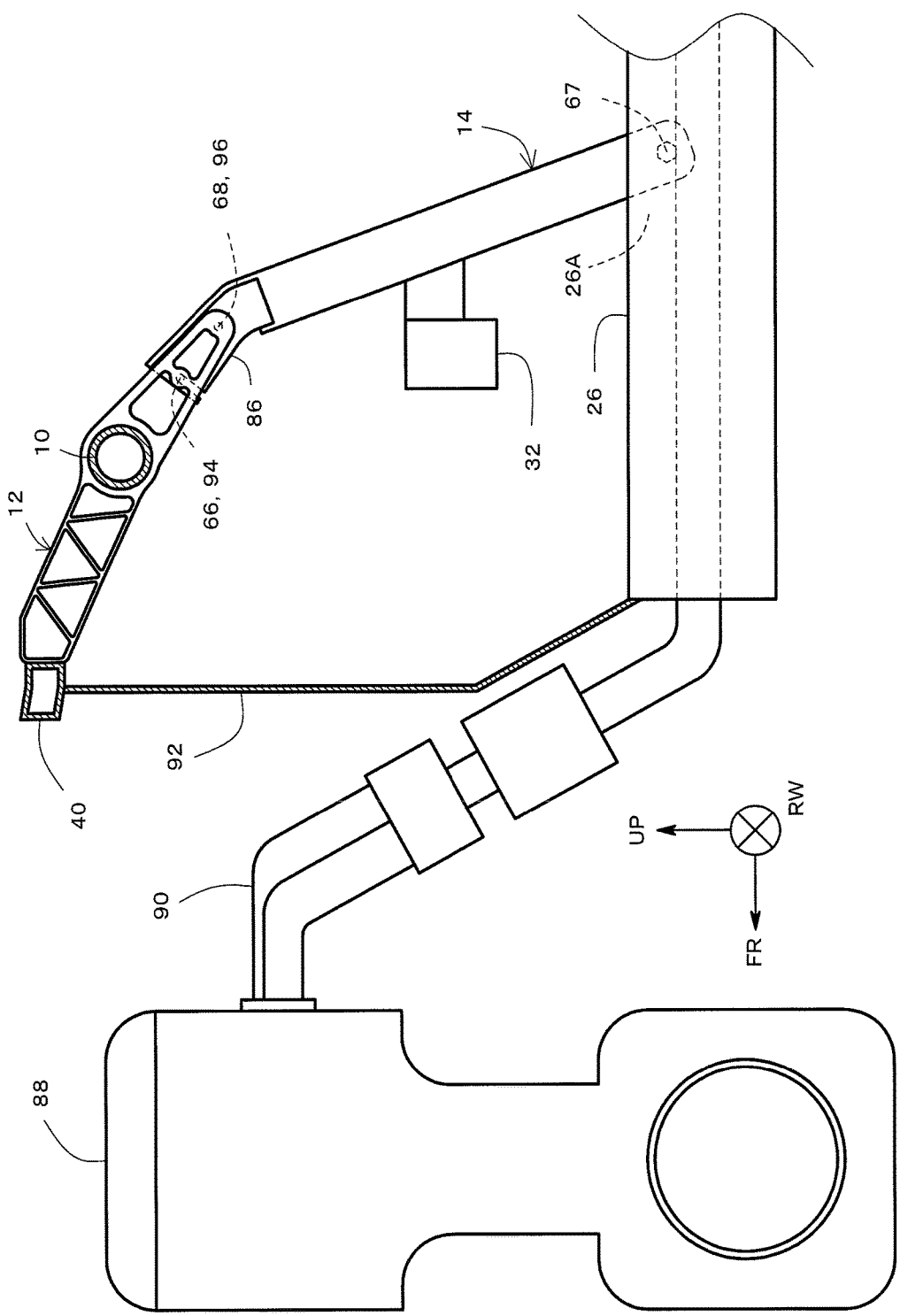
FIG. 14 is a side view exemplifying a reinforcement structure at a front side of a vehicle cabin and a peripheral structure thereof before a front collision.
Figure 15:
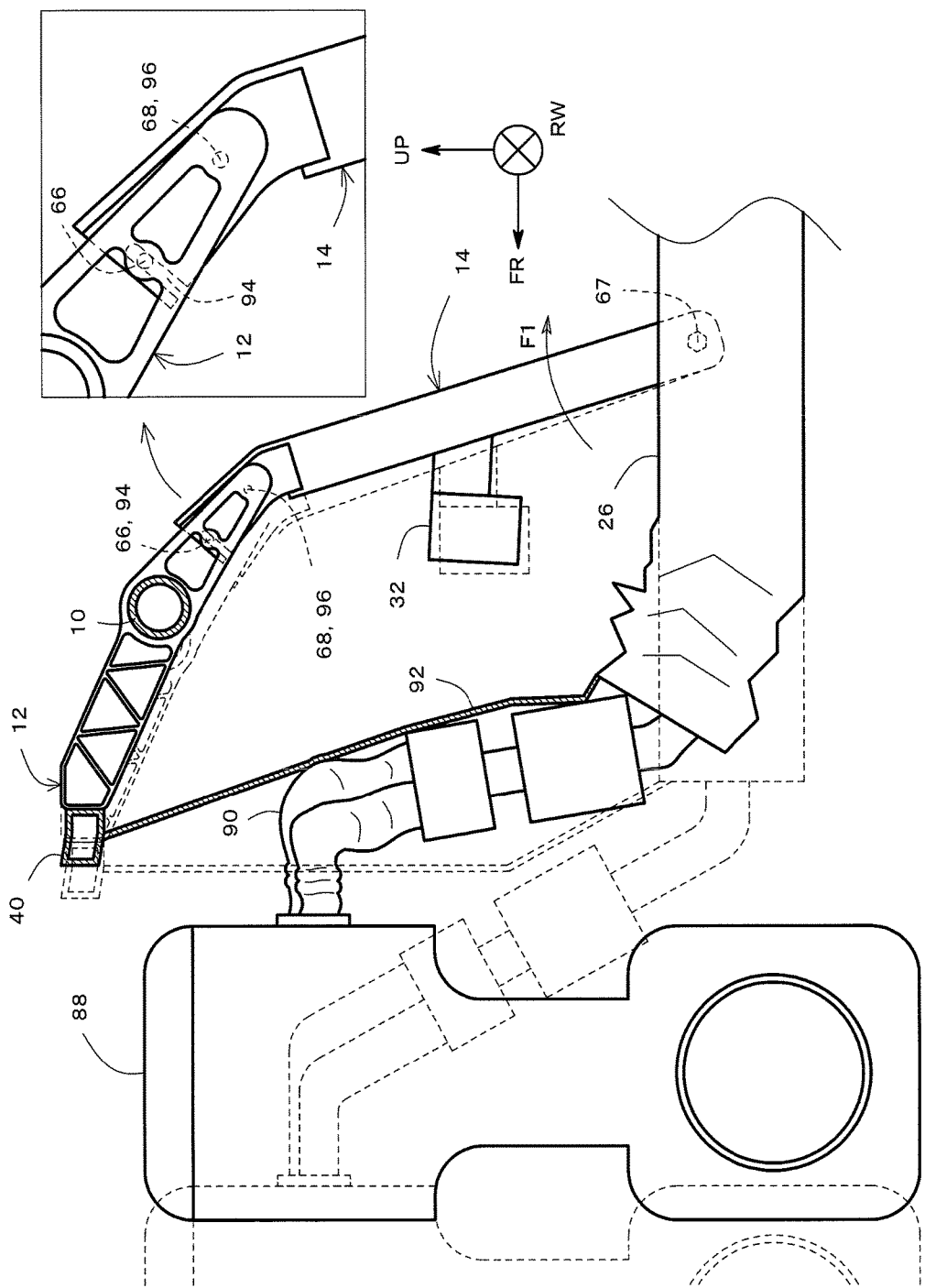
FIG. 15 is a side view exemplifying the reinforcement structure at the front side of the vehicle cabin and the peripheral structure thereof at the time of the front collision.
Figure 16:
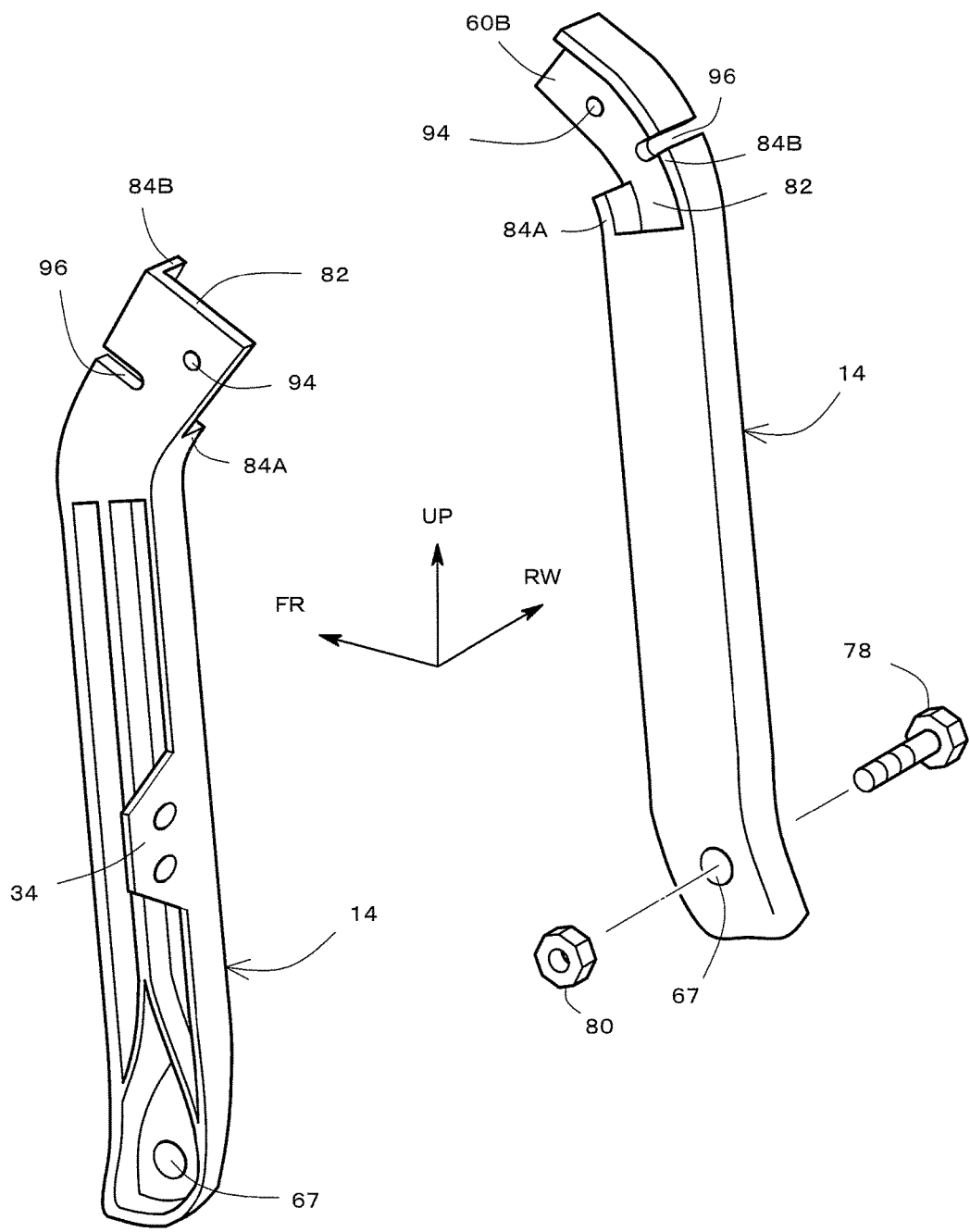
FIG. 16 is a side view exemplifying an alternative configuration of the second embodiment of the present disclosure.

A behavior of the reinforcement structure at the front side of the vehicle cabin according to the second embodiment during the front collision will now be described with reference to FIGS. 14 and 15. FIG. 14 exemplifies the reinforcement structure at the front side of the vehicle cabin and a peripheral structure thereof before the front collision, and FIG. 15 exemplifies the reinforcement structure at the front side of the vehicle cabin and the peripheral structure thereof at the time of the front collision.

Similar to the process described above in relation to the first embodiment, at the time of the front collision, the rotational load F1 in the clockwise direction in the side view is applied to the floor brace 14, having the third bolt joint portion 67 at the lower end of the floor brace 14 as a pivot and the upper end of the floor brace 14 as a point of application of force.

The floor brace 14 having its rotation restricted by the upper end thereof being two-point supported is deflected with the input of the rotational load F1. At this point, in order to resolve the deflection of the floor brace 14, as exemplified in an enlarged diagram at a top right of FIG. 15, the stud bolt 66 slides within the first bolt hole 94. With this sliding, the floor brace 14 rotates with the third bolt joint portion 67 as a pivot. As a result, the support of the upper end of the floor brace 14 is sustained.

<Alternative Configuration of Second Embodiment>

In the example configuration of FIGS. 12~15, the U-shaped hole is employed as the first bolt hole 94 and the closed circular hole is employed as the second bolt hole 96, but the structure is not limited to such a form. For example, as exemplified in FIG. 16, the closed circular hole may be employed as the first bolt hole 94, and the U-shaped hole may be employed as the second bolt hole 96. In this case, the direction of cutout of the second bolt hole 96 is desirably set to a slanted upward direction of the vehicle, based on the rotational load applied to the floor brace 14 at the time of the front collision.

Figure 17:
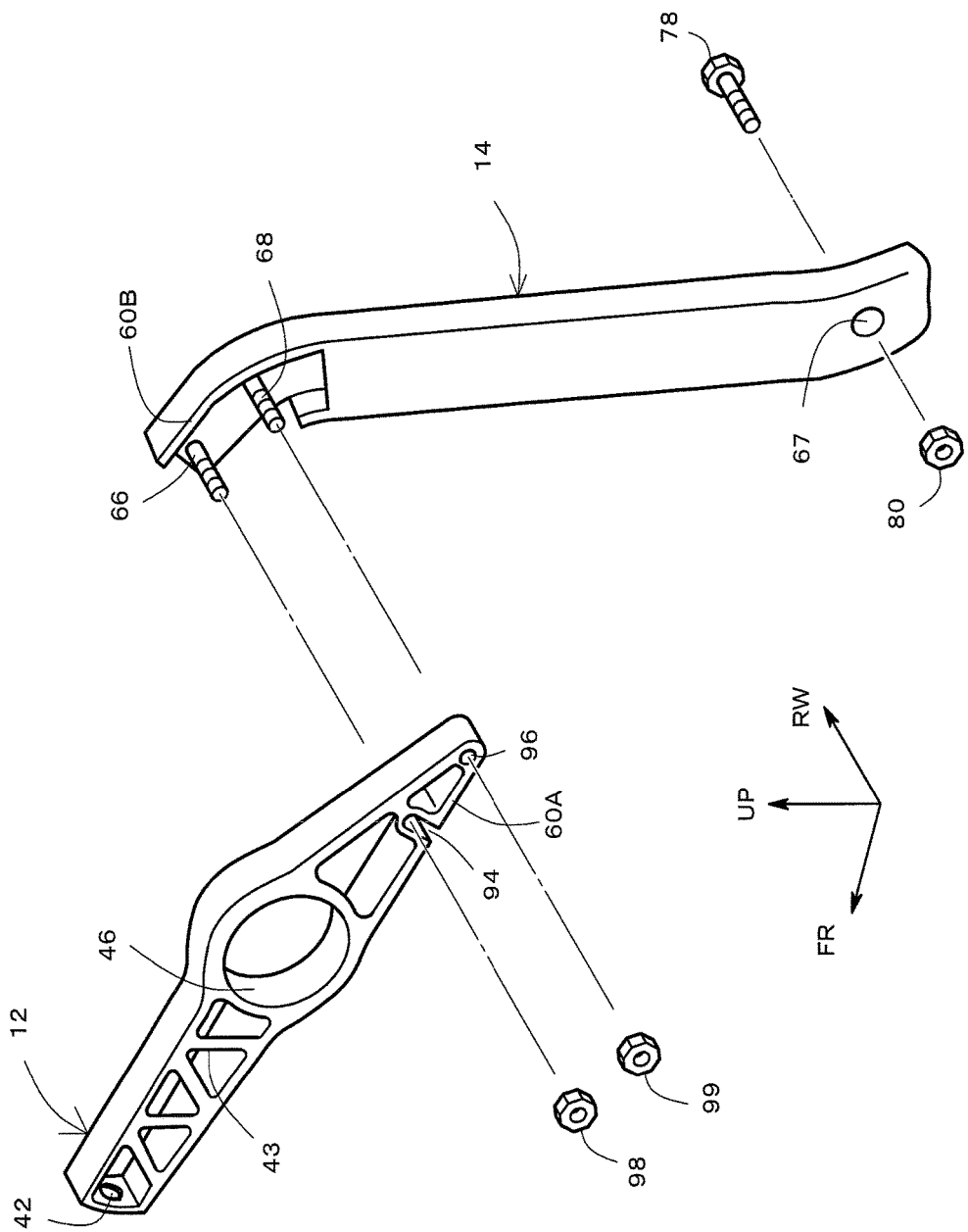
FIG. 17 is a perspective diagram exemplifying another alternative configuration of the second embodiment of the present disclosure.
Figure 18:
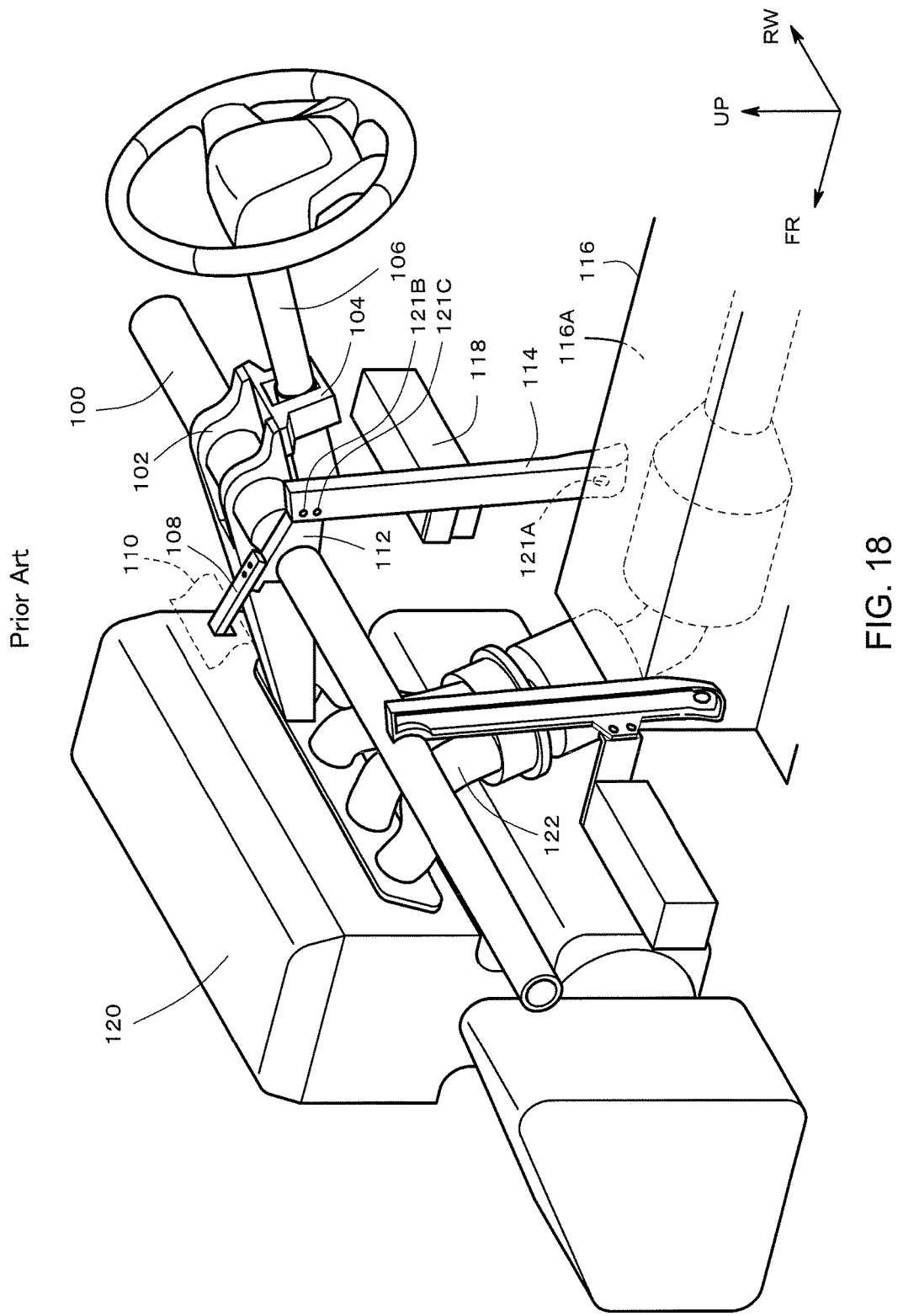
FIG. 18 is a perspective diagram exemplifying a reinforcement structure at a front side of a vehicle cabin in the related art.
Figure 19:
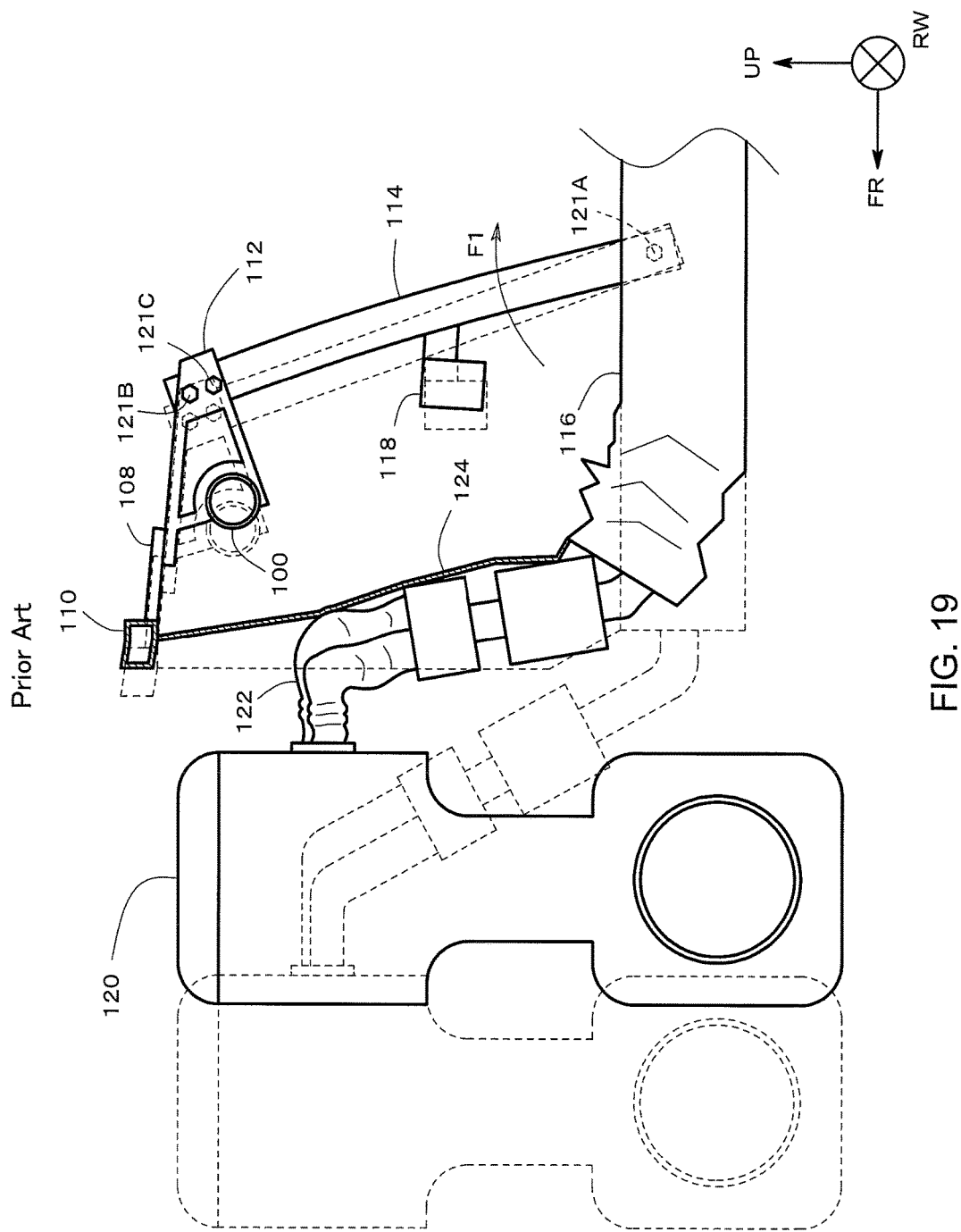
FIG. 19 is a side view for explaining a front collision with the reinforcement structure at the front side of the vehicle cabin of the related art.

In addition, in the example configuration of FIGS. 12~15, the first bolt hole 94 and the second bolt hole 96 are provided on the overlap portion 60B of the floor brace 14, but alternatively, the first bolt hole 94 and the second bolt hole 96 may be provided on the overlap portion 60A of the cowl-to brace 12, as shown in FIG. 17. In this case, the stud bolts 66 and 68 are provided on the overlap portion 60B of the floor brace 14.

Further alternatively, a configuration may be employed in which one of the first bolt hole 94 and the second bolt hole 96 and one of the stud bolts 66 and 68 are provided on the overlap portion 60B of the floor brace 14, and the other of the first bolt hole 94 and the second bolt hole 96 and the other of the stud bolts 66 and 68 are provided on the overlap portion 60A of the cowl-to brace 12.

The present disclosure is not limited to the embodiments described above, and includes all changes and modifications within the scope and spirit of the present disclosure as defined in the claims.

The invention claimed is:

1. A reinforcement structure at a front side of a vehicle cabin, comprising:
    an instrument panel reinforcement pipe that extends in a width direction of a vehicle and that supports a steering column;
    a cowl-to brace that extends in a front-and-rear direction of the vehicle, that has a front end joined to a cowl panel placed at a farther front side of the vehicle than the instrument panel reinforcement pipe, and that comprises a joint portion to be joined to the instrument panel reinforcement pipe, between the front end and a rear end; and
    a floor brace that has an upper end joined to the rear end of the cowl-to brace, that is placed to incline toward a rear side of the vehicle, from the upper end toward a lower end, and that has the lower end joined to a side wall of a floor tunnel, wherein
    the rear end of the cowl-to brace and the upper end of the floor brace comprise overlap portions which overlap each other in the front-and-rear direction of the vehicle,
    a first bolt joint portion and a second bolt joint portion which are bolt-joined in the width direction of the vehicle are formed on each of the overlap portions of the cowl-to brace and the floor brace, and
    a fragile portion which crosses between the first bolt joint portion and the second bolt joint portion is formed on one of the overlap portions of the cowl-to brace and the floor brace.

2. The reinforcement structure at the front side of the vehicle cabin according to claim 1, wherein
    a direction of crossing of the fragile portion is non-parallel to an up-and-down direction of the vehicle.

3. A reinforcement structure at a front side of a vehicle cabin, comprising:
    an instrument panel reinforcement pipe that extends in a width direction of a vehicle, and that supports a steering column;
    a cowl-to brace that extends in a front-and-rear direction of the vehicle, that has a front end joined to a cowl panel placed at a farther front side of the vehicle than the instrument panel reinforcement pipe, and that comprises a joint portion to be joined to the instrument panel reinforcement pipe, between the front end and a rear end; and
    a floor brace that has an upper end joined to the rear end of the cowl-to brace, that is placed to incline toward a rear side of the vehicle, from the upper end toward a lower end, and that has the lower end joined to a side wall of a floor tunnel, wherein
    the rear end of the cowl-to brace and the upper end of the floor brace comprise overlap portions which overlap each other in the front-and-rear direction of the vehicle,
    a first bolt hole and a second bolt hole bored in the width direction of the vehicle are formed on one of the overlap portions of the cowl-to brace and the floor brace, and a first bolt shaft portion and a second bolt shaft portion which extend in the width direction of the vehicle are formed on the other of the overlap portions, and
    one of the first bolt hole and the second bolt hole is a closed circular hole, and the other of the first bolt hole and the second bolt hole is a U-shaped hole with a partial cutout.

* * * * *